(12) United States Patent
Imaizumi et al.

(10) Patent No.: US 10,461,312 B2
(45) Date of Patent: Oct. 29, 2019

(54) POSITIVE-ELECTRODE ACTIVE MATERIAL FOR NONAQUEOUS ELECTROLYTE SECONDARY BATTERY AND METHOD FOR PRODUCING THE SAME, AND NONAQUEOUS ELECTROLYTE SECONDARY BATTERY

(75) Inventors: Shin Imaizumi, Niihama (JP); Rei Kokado, Niihama (JP); Kensaku Mori, Niihama (JP)

(73) Assignee: SUMITOMO METAL MINING CO., LTD., Tokyo (JP)

(*) Notice: Subject to any disclaimer, the term of this patent is extended or adjusted under 35 U.S.C. 154(b) by 829 days.

(21) Appl. No.: 13/811,465

(22) PCT Filed: Apr. 1, 2011

(86) PCT No.: PCT/JP2011/001977
§ 371 (c)(1),
(2), (4) Date: Apr. 1, 2013

(87) PCT Pub. No.: WO2012/011212
PCT Pub. Date: Jan. 26, 2012

(65) Prior Publication Data
US 2013/0189581 A1 Jul. 25, 2013

(30) Foreign Application Priority Data
Jul. 23, 2010 (JP) .................................. 2010-165490

(51) Int. Cl.
*H01M 4/131* (2010.01)
*C01G 23/00* (2006.01)
(Continued)

(52) U.S. Cl.
CPC .......... *H01M 4/131* (2013.01); *C01G 23/002* (2013.01); *C01G 51/42* (2013.01); *C01G 53/42* (2013.01);
(Continued)

(58) Field of Classification Search
None
See application file for complete search history.

(56) References Cited

U.S. PATENT DOCUMENTS

2003/0035999 A1* 2/2003 Gao ..................... C01G 23/005
429/231.1
2004/0201948 A1* 10/2004 Hosoya ................. H01M 4/131
361/305
(Continued)

FOREIGN PATENT DOCUMENTS

JP       2005044743 A   *  2/2005

OTHER PUBLICATIONS

Cao, Hui. "Structural and Electrochemical Characteristics of Co and Al Co-doped Lithium Nickelate Cathode Materials for Lithium-ion Batteries." J Alloy Compd 376 (2004): 282-86.*
(Continued)

*Primary Examiner* — Robert S Carrico
(74) *Attorney, Agent, or Firm* — Kratz, Quintos & Hanson, LLP

(57) ABSTRACT

The present invention provides a cathode active material for a nonaqueous electrolyte secondary battery with a high capacity, high stability and excellent output characteristics and a method for producing the same, and a nonaqueous electrolyte secondary battery using the cathode active material.
The cathode active material for a nonaqueous electrolyte secondary battery is represented by a general formula: $Li_tNi_{1-x-y-z}Co_xAl_yTi_zO_2$ wherein $0.98 \leq t \leq 1.10$, $0 < x \leq 0.30$, $0.03 \leq y \leq 0.15$, $0.001 \leq z \leq 0.03$; and includes a hexagonal lithium-containing composite oxide with a layer structure of secondary particles having primary particles, in which a titanium-enriched layer is formed on a surface of the primary particles and/or a grain boundary between the primary particles. The titanium-enriched layer on the surface of the
(Continued)

primary particles and/or a grain boundary between the primary particles serves as a lithium ion conductor, yielding smooth extraction and insertion of lithium ions. Accordingly, the secondary battery with a high capacity, high stability and excellent output characteristics can be produced when a positive electrode is formed with the lithium nickel composite oxide as a cathode active material.

9 Claims, 10 Drawing Sheets

(51) Int. Cl.
    *C01G 53/00*     (2006.01)
    *H01M 4/525*     (2010.01)
    *C01G 51/00*     (2006.01)
    *H01M 10/052*     (2010.01)

(52) U.S. Cl.
    CPC ............ *C01G 53/50* (2013.01); *H01M 4/525* (2013.01); *C01P 2002/52* (2013.01); *C01P 2004/03* (2013.01); *C01P 2004/04* (2013.01); *C01P 2004/54* (2013.01); *C01P 2004/61* (2013.01); *C01P 2004/62* (2013.01); *C01P 2006/40* (2013.01); *H01M 10/052* (2013.01)

(56) References Cited

U.S. PATENT DOCUMENTS

| | | | |
|---|---|---|---|
| 2006/0263690 A1* | 11/2006 | Suhara | C01G 51/006 |
| | | | 429/231.3 |
| 2007/0082265 A1* | 4/2007 | Itou | H01M 4/131 |
| | | | 429/223 |
| 2008/0090150 A1* | 4/2008 | Nakura | H01M 4/362 |
| | | | 429/223 |

OTHER PUBLICATIONS

Liu, Hansan. "A comparative study of LiNi0.8Co0.2O2 cathode materials modified by lattice-doping and surface-coating." Solid State Ionics 166 (2004): 317-325.*

Chowdari, B.V.R. et al. "Cathodic Performance of Anatase (Tio2)-Coated Li(Ni0.8Co0.2)O2". Journal of Solid State Electrochemistry, vol. 6, No. 8, 2002, pp. 565-567. Springer Nature, doi:10.1007/s10008-002-0287-2.*

Robertson, A.D. et al. "New Inorganic Spinel Oxides for Use as Negative Electrode Materials in Future Lithium-Ion Batteries". Journal of Power Sources, vol. 81-82, 1999, pp. 352-357. Elsevier BV, doi:10.1016/s0378-7753(98)00217-1. (Year: 1999).*

Kim, J. et al., Material Characterization and Electrochemical Study on LiNi0.95Ti0.05O2 Materials, Journal of The Electrochemical Society, 150 (11) A1491-A1497 (2003).

* cited by examiner

FIG. 3
(A)
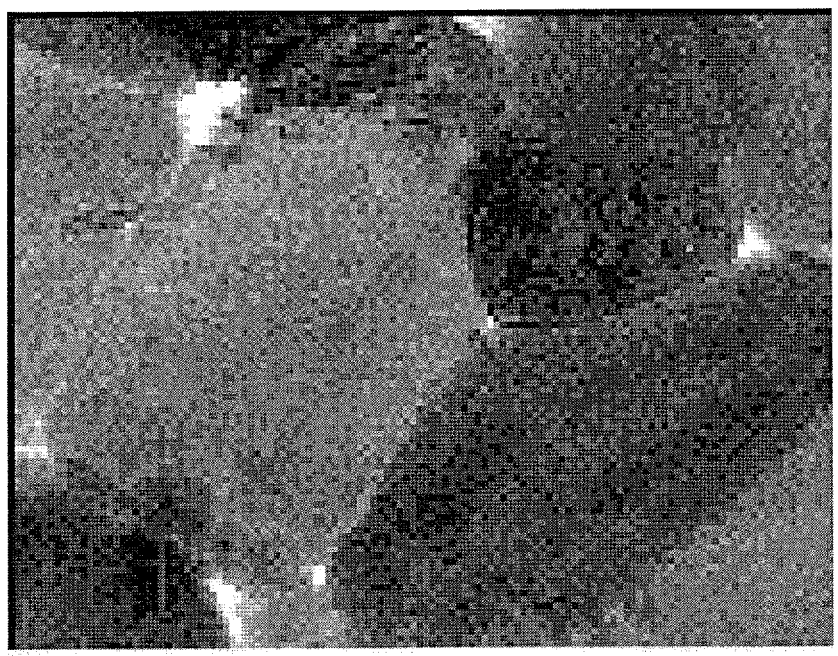
(B)
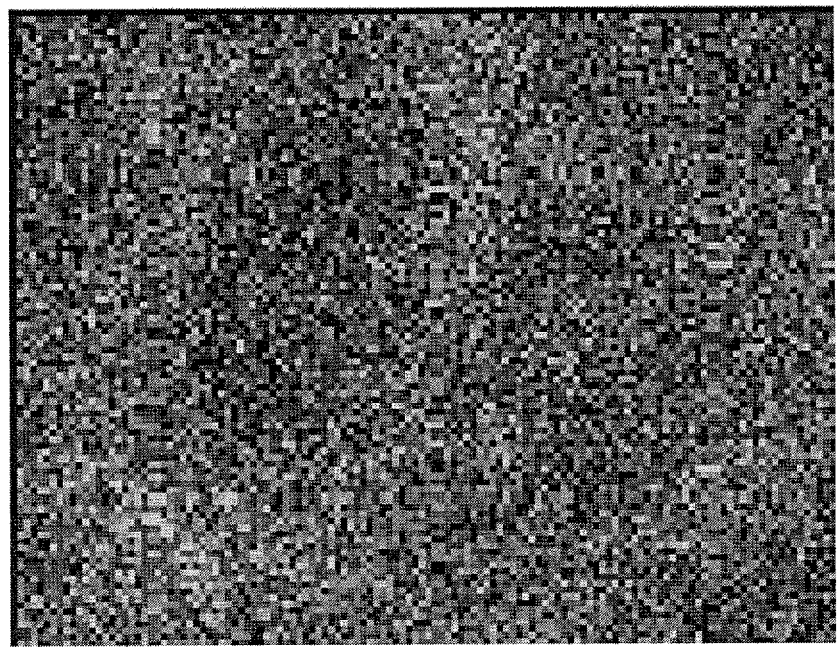

F I G. 6

| | COMPOSITION | WASHING PROCESS | AVERAGE PARTICLE DIAMETER ($\mu$m) | SITE OCCUPANCY EXCEPT Li METAL ION IN 3a SITE (%) | INITIAL DISCHARGE CAPACITY (mAh·g$^{-1}$) | POSITIVE ELECTRODE RESISTANCE ($\Omega$) | 500 CYCLE CAPACITY MAINTENANCE FACTOR (%) |
|---|---|---|---|---|---|---|---|
| EXAMPLE 1 | $Li_{1.06}Ni_{0.745}Co_{0.14}Al_{0.1}Ti_{0.005}O_2$ | NO | 4.6 | 1.0 | 172.9 | 3.5 | 90 |
| EXAMPLE 2 | $Li_{1.01}Ni_{0.745}Co_{0.14}Al_{0.1}Ti_{0.005}O_2$ | YES | 4.4 | 1.0 | 180.9 | 3.7 | 91 |
| EXAMPLE 3 | $Li_{1.02}Ni_{0.74}Co_{0.14}Al_{0.1}Ti_{0.02}O_2$ | NO | 3.9 | 1.2 | 173.5 | 3.8 | 90 |
| EXAMPLE 4 | $Li_{1.02}Ni_{0.74}Co_{0.14}Al_{0.1}Ti_{0.02}O_2$ | YES | 3.8 | 1.2 | 178.4 | 3.9 | 90 |
| EXAMPLE 5 | $Li_{1.015}Ni_{0.745}Co_{0.20}Al_{0.05}Ti_{0.005}O_2$ | YES | 4.5 | 0.8 | 181.2 | 3.5 | 89 |
| EXAMPLE 6 | $Li_{1.07}Ni_{0.745}Co_{0.10}Al_{0.15}Ti_{0.005}O_2$ | YES | 4.3 | 1.2 | 179.1 | 3.9 | 90 |
| COMPARATIVE EXAMPLE 1 | $Li_{1.06}Ni_{0.75}Co_{0.15}Al_{0.1}O_2$ | NO | 4.7 | 0.9 | 172.7 | 4.3 | 87 |
| COMPARATIVE EXAMPLE 2 | $Li_{1.09}Ni_{0.75}Co_{0.15}Al_{0.1}O_2$ | YES | 4.5 | 0.9 | 180.2 | 6.2 | 87 |
| COMPARATIVE EXAMPLE 3 | $Li_{1.06}Ni_{0.715}Co_{0.135}Al_{0.095}Ti_{0.03}$ | NO | 4.7 | 2.5 | 165.5 | 5.8 | 89 |
| COMPARATIVE EXAMPLE 4 | $Li_{1.06}Ni_{0.745}Co_{0.14}Al_{0.1}Ti_{0.005}O_2$ | NO | 5.3 | 2.2 | 165.4 | 7.5 | 78 |

FIG. 7

| | COMPOSITION | WASHING PROCESS | SITE OCCUPANCY EXCEPT Li METAL ION IN 3a SITE (%) | INITIAL DISCHARGE CAPACITY (mAh·g$^{-1}$) | POSITIVE ELECTRODE RESISTANCE (Ω) | 500 CYCLE CAPACITY MAINTENANCE FACTOR (%) |
|---|---|---|---|---|---|---|
| EXAMPLE 7 | $Li_{1.06}Ni_{0.75}Co_{0.14}Al_{0.1}Ti_{0.01}O_2$ | NO | 1.0 | 180.5 | 4.0 | 90 |
| EXAMPLE 8 | $Li_{1.02}Ni_{0.75}Co_{0.14}Al_{0.1}Ti_{0.01}O_2$ | YES | 1.0 | 183.2 | 4.0 | 91 |
| EXAMPLE 9 | $Li_{1.06}Ni_{0.78}Co_{0.165}Al_{0.05}Ti_{0.005}O_2$ | NO | 1.0 | 190.2 | 3.9 | 86 |
| EXAMPLE 10 | $Li_{1.015}Ni_{0.78}Co_{0.165}Al_{0.05}Ti_{0.005}O_2$ | YES | 1.0 | 191.8 | 3.9 | 88 |
| COMPARATIVE EXAMPLE 5 | $Li_{1.06}Ni_{0.75}Co_{0.15}Al_{0.1}O_2$ | NO | 0.9 | 175.2 | 4.5 | 90 |
| COMPARATIVE EXAMPLE 6 | $Li_{1.02}Ni_{0.75}Co_{0.15}Al_{0.1}O_2$ | YES | 0.9 | 182.3 | 7.8 | 87 |
| COMPARATIVE EXAMPLE 7 | $Li_{1.06}Ni_{0.75}Co_{0.15}Al_{0.1}O_2$ | NO | 2.1 | 172.7 | 6.2 | 80 |
| COMPARATIVE EXAMPLE 8 | $Li_{1.06}Ni_{0.75}Co_{0.15}Al_{0.1}O_2$ | NO | 2.3 | 170.3 | 5.8 | 78 |

F I G. 1 0
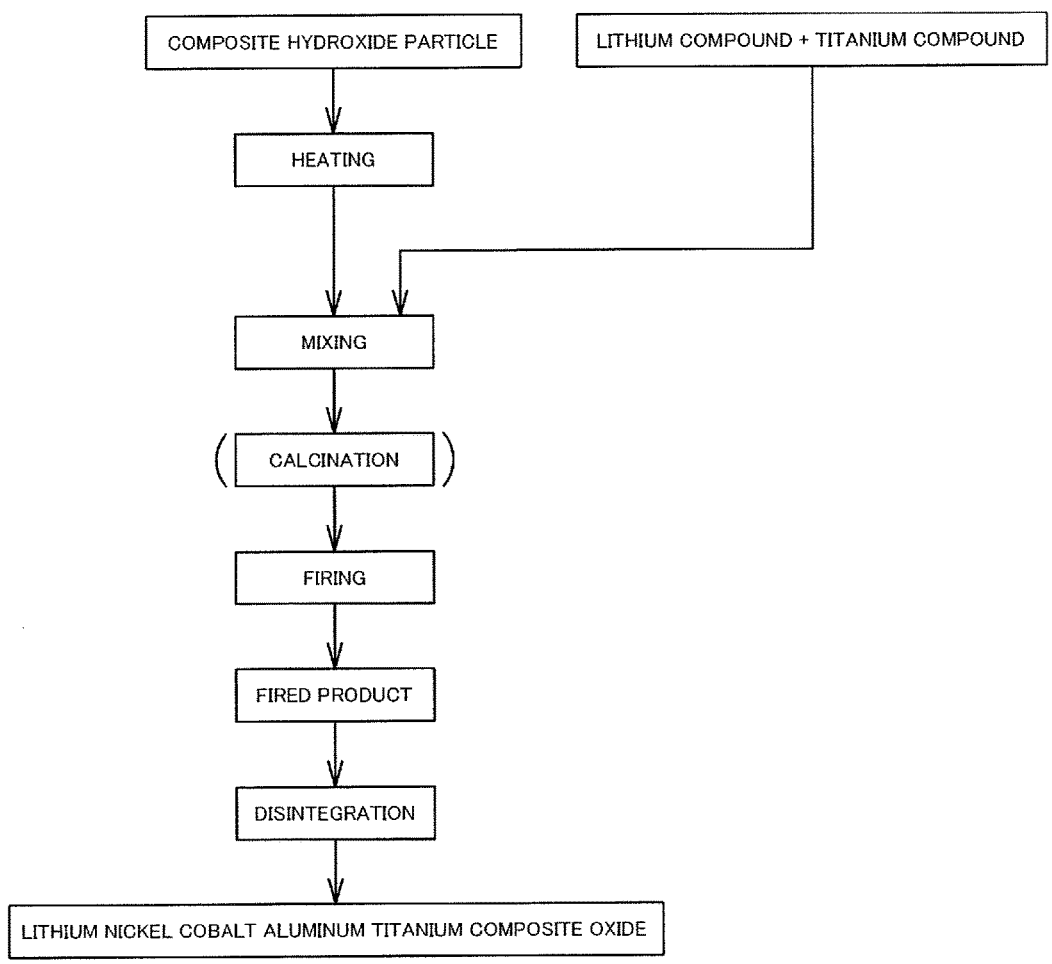

POSITIVE-ELECTRODE ACTIVE MATERIAL FOR NONAQUEOUS ELECTROLYTE SECONDARY BATTERY AND METHOD FOR PRODUCING THE SAME, AND NONAQUEOUS ELECTROLYTE SECONDARY BATTERY

TECHNICAL FIELD

The present invention relates to a cathode active material for a nonaqueous electrolyte secondary battery and a method for producing the same, and a nonaqueous electrolyte secondary battery.

BACKGROUND ART

In recent years, along with the spread of mobile electronic devices such as mobile phones and notebook-sized personal computers, development of smaller and lighter nonaqueous electrolyte secondary batteries having a high energy density has been strongly demanded.

Additionally, development of high power secondary batteries as batteries for electric automobiles typified by hybrid automobiles has been strongly demanded.

The secondary batteries that meet such demands are exemplified by lithium ion secondary batteries. Lithium ion secondary batteries include a negative electrode, a positive electrode, an electrolytic solution and the like, in which a material into and from which lithium can be inserted and desorbed has been used as an active material for the negative and positive electrodes.

Research and development of the lithium ion secondary batteries have been extensively carried out at present, and in particular, lithium ion secondary batteries in which a layer or spinel type lithium metal composite oxide is used as a positive electrode material can achieve a voltage as high as 4V; therefore, practical applications thereof as batteries having a high energy density have been accelerated.

As cathode active materials for use in such lithium ion secondary batteries, proposed are lithium composite oxides such as a lithium nickel composite oxide ($LiNiO_2$), a lithium nickel cobalt manganese composite oxide ($LiNi_{1/3}Co_{1/3}Mn_{1/3}O_2$), and a lithium manganese composite oxide ($LiMn_2O_4$). Lithium cobalt composite oxides ($LiCoO_2$) are currently in vogue because they can be comparatively easily synthesized.

On the other hand, lithium nickel composite oxides have been receiving attention recently because they have a larger capacity compared with the lithium cobalt composite oxides, and moreover, batteries having a high energy density can be produced at a low price therewith.

Unfortunately, such advantageous lithium nickel composite oxides are inferior in point of thermal stability in a state of charge to lithium cobalt composite oxides. That is, pure lithium nickel dioxides cannot have been used for practical batteries because problems lie in safety of thermal stability or the like, charge-discharge cycle characteristics, and the like. This is because stability of a crystal structure thereof in a state of charge is lower than that of the lithium cobalt composite oxide.

In order to solve the problems of the lithium nickel composite oxides, in general, transition metal elements such as cobalt, manganese, iron or different types of elements such as aluminum, vanadium, tin are substituted for a part of nickel to stabilize the crystal structure in the state of charge with lithium desorbed, thereby obtaining lithium nickel composite oxides with excellent safety and charge-discharge cycle characteristics as a cathode active material (For example, see Non-Patent Literature 1 and Patent Literature 1).

Additionally, Patent Literature 2 discloses a cathode active material represented by $LiNi_{1-x-y}Co_xTi_yO_2$ wherein $0<x\leq0.20$, $0<y\leq0.07$ and including a hexagonal lithium-containing composite oxide with a layer structure. In the cathode active material, a site occupancy of metal ions except lithium is 5% or less in a 3a site if each site of 3a, 3b and 6c in the lithium-containing composite oxide is represented by $[Li]_{3a}[Ni_{1-x-y}Co_xTi_y]_{3b}[O_2]_{6c}$.

It is also described that the cathode active material has excellent cycle characteristics and can improve thermal stability of batteries without loss of an initial capacity thereof.

Further, a technique to carry out a washing process after firing has been developed for improving thermal stability and capacity of the lithium nickel composite oxides.

Patent Literature 3 discloses a technique to wash with water fired powder represented by a compositional formula: $LiNi_{1-a}M_aO_2$ wherein $0.01\leq a\leq 0.5$ and M represents at least one element selected from a transition metal element except Ni, a group 2 element and a group 13 element.

It is also described that the washing process can sufficiently remove impurities and by-products adhered to a surface of the fired powder to improve thermal stability and capacity.

Recently, lithium ion secondary batteries have been used for applications required for an instant high current such as batteries for hybrid electric vehicles, and therefore, a high power thereof has been required.

In Patent Literature 2, consideration with respect to increasing an output is not described when the cathode active material is used for a positive electrode of a secondary battery. Moreover, a performance of the cathode active material described in Patent Literature 2 is not sufficient when it is used as secondary batteries for an application required for an instant high current.

The technique described in Patent Literature 3 is regarded to improve a property of the lithium nickel composite oxide by the washing process, however, the washing process unfortunately causes damage on a surface of the lithium nickel composite oxide, resulting in deterioration of output characteristics.

As described above, cathode active materials have not been developed for the present which are capable of a high power suitable for an application required for an instant high current such as batteries for hybrid electric vehicles. Therefore, the development of such cathode active materials is required.

CITATION LIST

Patent Literatures

Patent Literature 1: Japanese Patent Laid-Open No. 05-242891

Patent Literature 2: Japanese Patent Laid-Open No. 2000-323122

Patent Literature 3: Japanese Patent Laid-Open No. 2007-273106

Non Patent Literature 1: Komitsudo Lithium Nijidenchi (High-density lithium secondary battery) P.61 to 78, Techno system Co., Ltd. (Mar. 14, 1998)

SUMMARY OF INVENTION

Technical Problem

In view of the above circumstances, an object of the present invention is to provide a cathode active material for a nonaqueous electrolyte secondary battery with a high capacity, high stability and excellent output characteristics and a method for producing the same, and a nonaqueous electrolyte secondary battery used therewith.

Solution to Problem (Cathode Active Material for Nonaqueous Electrolyte Secondary Battery)

A cathode active material for a nonaqueous electrolyte secondary battery according to a first aspect of the present invention is represented by a general formula: $Li_tNi_{1-x-y-z}Co_xAl_yTi_zO_2$ wherein $0.98 \leq t \leq 1.10$, $0 < x \leq 0.30$, $0.03 \leq y \leq 0.15$, $0.001 \leq z \leq 0.03$; and comprises a hexagonal lithium-containing composite oxide with a layer structure of secondary particles having primary particles, wherein a titanium-enriched layer is formed on a surface of the primary particles and/or a grain boundary between the primary particles.

A cathode active material for a nonaqueous electrolyte secondary battery according to a second aspect of the present invention is the first aspect of the present invention, wherein a site occupancy of metal ions except lithium obtained by Rietveld refinement using X-ray diffraction of the lithium-containing composite oxide is 2% or less in a 3a site if each site of 3a, 3b and 6c in the lithium-containing composite oxide is represented by $[Li]_{3a}[Ni_{1-x-y-z}Co_xAl_yTi_z]_{3b}[O_2]_{6c}$.

A cathode active material for a nonaqueous electrolyte secondary battery according to a third aspect of the present invention is the first or second aspect of the present invention, wherein a shape of the secondary particle is spherical or substantially spherical.

A cathode active material for a nonaqueous electrolyte secondary battery according to a fourth aspect of the present invention is the first, second or third aspect of the present invention, wherein an average particle diameter of the secondary particles is 3 to 8 μm, and a value represented by a expression of: [(d90−d10)/average particle diameter] as a marker indicating spreading of a particle size distribution is 0.60 or less.

(Method for Producing Cathode Active Material for Nonaqueous Electrolyte Secondary Battery)

A method for producing a cathode active material for a nonaqueous electrolyte secondary battery according to a fifth aspect of the present invention is a method for producing the cathode active material for a nonaqueous electrolyte secondary battery according to the first, second, third or fourth aspect of the present invention, the method comprises the steps of: heat treating a nickel cobalt aluminum composite hydroxide represented by a general formula: $Ni_{1-x-y-z}Co_xAl_y(OH)_2$ wherein $0 < x \leq 0.30$, $0.03 \leq y \leq 0.15$; mixing the nickel cobalt aluminum composite hydroxide and/or a nickel cobalt aluminum composite oxide, a lithium compound, and a titanium compound; and firing the mixture at 700 to 820° C. for 4 hours or more.

A method for producing a cathode active material for a nonaqueous electrolyte secondary battery according to a sixth aspect of the present invention is a method for producing the cathode active material for a nonaqueous electrolyte secondary battery according to the first, second, third or fourth aspect of the present invention, the method comprises the steps of: heat treating a nickel cobalt aluminum titanium composite hydroxide represented by a general formula: $Ni_{1-x-y-z}Co_xAl_yTi_z(OH)_2$ wherein $0 < x \leq 0.30$, $0.03 \leq y \leq 0.15$, $0.001 \leq z \leq 0.03$; mixing the nickel cobalt aluminum titanium composite hydroxide and/or a nickel cobalt aluminum titanium composite oxide, and a lithium compound; and firing the mixture at 700 to 820° C. for 4 hours or more.

A method for producing a cathode active material for a nonaqueous electrolyte secondary battery according to a seventh aspect of the present invention is the fifth or sixth aspect of the present invention, wherein an average particle diameter of the composite hydroxide is 3 to 7 μm, and a value represented by a expression of: [(d90−d10)/average particle diameter] as a marker indicating spreading of a particle size distribution is 0.55 or less.

A method for producing a cathode active material for a nonaqueous electrolyte secondary battery according to an eighth aspect of the present invention is the fifth, sixth or seventh aspect of the present invention, wherein a washing process is carried out after the firing.

(Nonaqueous Electrolyte Secondary Battery)

A nonaqueous electrolyte secondary battery according to a ninth aspect of the present invention has a positive electrode formed with the cathode active material for a nonaqueous electrolyte secondary battery according to the first, second, third or fourth aspect of the present invention.

Advantageous Effects of Invention (Cathode Active Material for Nonaqueous Electrolyte Secondary Battery)

According to the first aspect of the present invention, the titanium-enriched layer on the surface of the primary particles or a grain boundary between the primary particles serves as a lithium ion conductor, yielding smooth extraction and insertion of lithium ions. Accordingly, when the lithium nickel composite oxide is used for a positive electrode as a cathode active material, a secondary battery with high capacity, stability and output characteristics can be produced. Also, when the lithium nickel composite oxide is used for the positive electrode as a cathode active material, thermal stability can be improved because a percentage of unstable tetravalent nickel can be reduced in the lithium nickel composite oxide. Moreover, charge/discharge cycle stability can be improved because increasing stability of a crystal structure suppresses expansion/contraction of a crystal at the time of desorbing and inserting lithium in accordance with charging/discharging.

According to the second aspect of the present invention, capacity, stability and output characteristics of the secondary battery can be improved when the lithium nickel composite oxide is used for the positive electrode as a cathode active material.

According to the third aspect of the present invention, battery capacity per volume can be improved because packing density of the battery can be enhanced. Cycle characteristics can also be improved because a local reaction can be suppressed in the secondary particles.

According to the fourth aspect of the present invention, high power characteristics and durability characteristics can be achieved. Moreover, the cycle characteristics can be further improved because a redox reaction is equally carried out in accordance with desorbing and inserting lithium ions in active material particles.

(Method for Producing Cathode Active Material for Nonaqueous Electrolyte Secondary Battery)

According to the fifth aspect of the present invention, the titanium-enriched layer can be formed on the surface of the primary particles and/or a grain boundary between the primary particles included in the secondary particles in the cathode active material.

According to the sixth aspect of the present invention, the titanium-enriched layer can be formed on the surface of the primary particles and/or a grain boundary between the primary particles included in the secondary particles in the cathode active material.

According to the seventh aspect of the present invention, the particle diameter and the particle size distribution can be controlled strictly in the cathode active material for a nonaqueous electrolyte secondary battery.

According to the eighth aspect of the present invention, both improving thermal stability and increasing capacity in the secondary battery can be achieved when the produced lithium nickel composite oxide is used for the positive electrode as a cathode active material because the washing process is carried out after the firing.

(Nonaqueous Electrolyte Secondary Battery)

According to the ninth aspect of the present invention, a nonaqueous electrolyte secondary battery with high capacity, stability and output characteristics can be produced.

BRIEF DESCRIPTION OF DRAWINGS

FIG. 3 shows (A) a TEM photograph (magnification of observation: ×250,000) of a cross section of the lithium nickel composite oxide in Example 7 and (B) a photograph showing a Ti distribution in Example 7.

FIG. 6 is a table showing results of Examples and Comparative Examples.

FIG. 7 is a table showing results of Examples and Comparative Examples.

FIG. 10 is a schematic flow chart showing steps of producing the lithium nickel-containing composite oxide of the present invention.

DESCRIPTION OF EMBODIMENTS

Figure 1:
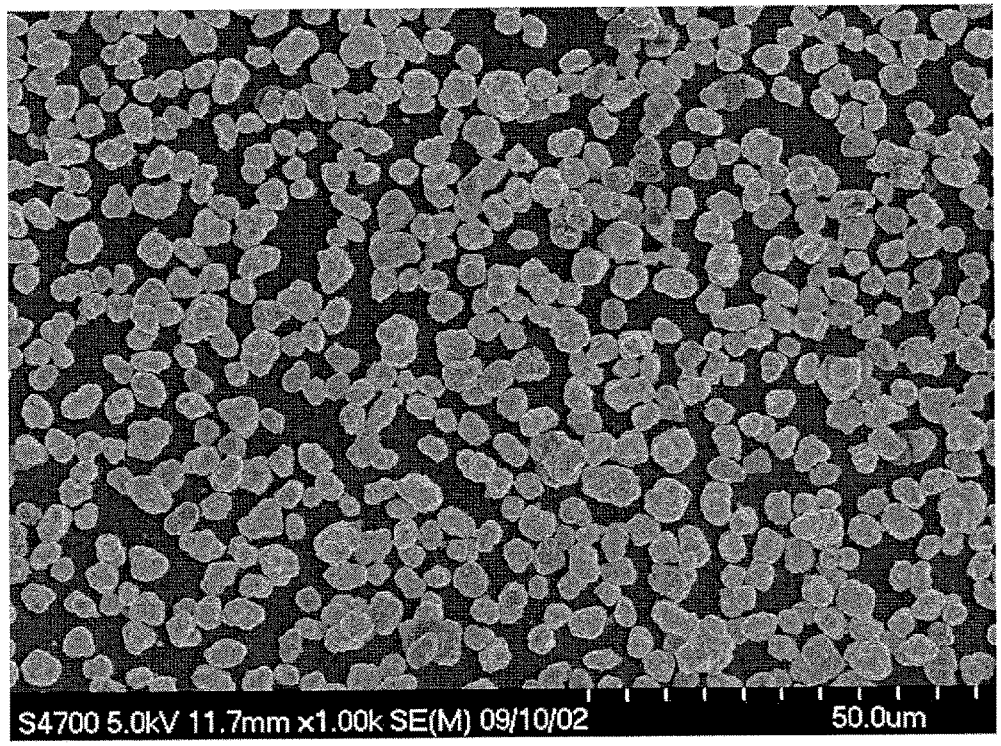
FIG. 1 shows an SEM photograph (magnification of observation: ×1,000) of a lithium nickel composite oxide in Example 1.

The present invention relates to a cathode active material for a nonaqueous secondary battery and a nonaqueous secondary battery whose positive electrode is formed therewith as a cathode active material. A predetermined structure of the cathode active material for a nonaqueous secondary battery can achieve high capacity, excellent cycle characteristics and a high power in the nonaqueous secondary battery.

(Cathode Active Material for Nonaqueous Electrolyte Secondary Battery)

The cathode active material for a nonaqueous electrolyte secondary battery of the present invention is a hexagonal lithium composite oxide with a layer structure in which cobalt, aluminum and titanium are substituted for a part of nickel, and controlled is a titanium concentration on the surface of the primary particles and a grain boundary between the primary particles in the lithium nickel-containing composite oxide.

Specifically, the cathode active material for a nonaqueous electrolyte secondary battery of the present invention (hereinafter, simply referred to as a cathode active material of the present invention) is represented by a general formula: $Li_tNi_{1-x-y-z}Co_xAl_yTi_zO_2$ wherein $0.98 \leq t \leq 1.10$, $0 < x \leq 0.30$, $0.03 \leq y \leq 0.15$, $0.001 \leq z \leq 0.03$; and includes a hexagonal lithium-containing composite oxide with a layer structure of the secondary particles having the primary particles, wherein a titanium-enriched layer is formed on a surface of the primary particles and/or a grain boundary between the primary particles.

When the titanium-enriched layer is formed on the surface of the primary particles and/or a grain boundary between the primary particles like the cathode active material of the present invention, the titanium-enriched layer serves as a lithium ion conductor, yielding smooth extraction and insertion of lithium ions.

Accordingly, when a positive electrode is formed with the cathode active material of the present invention, output characteristics of the nonaqueous electrolyte secondary battery with the positive electrode can be improved.

While the titanium-enriched layer of the cathode active material of the present invention is considered as a lithium titanium oxide, or an intermediate of a lithium titanium oxide and a lithium nickel dioxide, the titanium-enriched layer is not limited thereto.

Additionally, the titanium-enriched layer formed in the cathode active material of the present invention can prevent damage on the surface of the lithium nickel composite oxide particles, formation of a heterogeneous phase, for example, due to elution of lithium from a crystal lattice or a proton exchange, and the like in washing the cathode active material with water.

Accordingly, deterioration of the output characteristics of the nonaqueous electrolyte secondary battery can be suppressed if the cathode active material of the present invention is washed with water to form a positive electrode and then the positive electrode is applied to the nonaqueous electrolyte secondary battery.

In order to form the above titanium-enriched layer, a substitution amount of titanium for nickel is preferably not less than 0.1 at % and not more than 3 at % ($0.001 \leq z \leq 0.03$).

In the case where the substitution amount of titanium for nickel is less than 0.1 at %, the titanium-enriched layer is not formed. Therefore, the output characteristics of the nonaqueous electrolyte secondary battery cannot be improved and damage on the surface of the particles cannot be prevented in the washing process.

On the other hand, in the case where the substitution amount of titanium for nickel is over 3 at %, titanium ions entering a 3b site described below increases. Therefore, sufficient battery capacity cannot be obtained when this cathode active material is used for a positive electrode of the nonaqueous secondary battery.

Accordingly, it is preferable that a substitution amount of titanium for nickel is not less than 0.1 at % and not more than 3 at % ($0.001 \leq z \leq 0.03$) for forming the above titanium-enriched layer. More preferably, it is not less than 0.3 at % and not more than 1.5 at % ($0.003 \leq z \leq 0.015$) because both high battery capacity and excellent output characteristics can be achieved.

The unit of at % indicates an atomic composition percentage.

(Substitution Amount of Cobalt and Aluminum for Nickel)

In the cathode active material of the present invention, cobalt or aluminum is preferably substituted for a part of nickel.

The substitution enables reduction of a percentage of unstable tetravalent nickel in the cathode active material of the present invention. Therefore, the thermal stability can be improved when the cathode active material of the present invention is used for the positive electrode.

Moreover, charge/discharge cycle stability can also be improved because increasing stability of a crystal structure in the cathode active material of the present invention suppresses expansion/contraction of a crystal at the time of desorbing and inserting lithium in accordance with charging/discharging.

The reasons are described below.

In the case of considering the lithium nickel composite oxide as an active material of batteries, charging/discharging is performed by desorbing and inserting lithium. For example, a state of charge on the order of 200 mAh/g indicates that about 70% of lithium is desorbed from the lithium nickel composite oxide and the nickel becomes trivalent and tetravalent.

The tetravalent nickel is so unstable that it easily releases oxygen to become divalent (NiO) at a high temperature. Therefore, increasing the tetravalent nickel accelerates a thermal runaway.

In addition to substituting cobalt for a part of the nickel, stable trivalent aluminum is further substituted for the nickel in the 3b site in the lithium nickel composite oxide, so that a percentage of the unstable tetravalent nickel can be reduced.

Moreover, the stability of the crystal structure increases in the lithium nickel composite oxide, thereby suppressing the expansion/contraction of the crystal at the time of desorbing lithium from and inserting lithium into the crystal.

Accordingly, if cobalt or aluminum is substituted for a part of nickel in the cathode active material of the present invention, or the lithium nickel composite oxide, thermal stability and charge/discharge cycle stability can be improved in the secondary battery having the positive electrode formed with the cathode active material of the present invention.

In the cathode active material of the present invention, the substitution amount of cobalt and aluminum for nickel is not particularly limited, however, the substitution amount of cobalt for nickel is preferably not more than 30 at % ($0 < x \leq 0.30$), while the substitution amount of aluminum for nickel is preferably not less than 3 at % and not more than 15 at % ($0.03 \leq y \leq 0.15$).

If the substitution amount of cobalt and aluminum for nickel is not within the above range, the battery capacity and crystallinity may be reduced.

(Site Occupancy)

In the cathode active material of the present invention, a site occupancy of metal ions except lithium obtained by Rietveld refinement using X-ray diffraction is preferably adjusted to 2% or less in a 3a site if each site of 3a, 3b and 6c is represented by $[Li]_{3a}[Ni_{1-x-y-z}Co_xAl_yTi_z]_{3b}[O_2]_{6c}$.

The reasons are described below.

First, stoichiometry in the lithium nickel composite oxide can be calculated by Reitveld refinement using the X-ray diffraction (for example, R. A. Young, ed., "The Rietveld Method", Oxford University Press (1992)) with a site occupancy of each ion as an indicator.

In the case of a hexagonal compound, there are 3a, 3b and 6c sites. If $LiNiO_2$ has a perfect stoichiometry composition, site occupancies of 3a, 3b and 6c sites indicate 100% of lithium, nickel and oxygen respectively.

Lithium nickel composite oxides whose lithium-ion site occupancies are 98% or more in the 3a site have an almost ideal crystal structure, thus being considered to have excellent stoichiometry.

If the lithium nickel composite oxide is considered as an active material of the battery, lithium capable of extraction and insertion can maintain integrity of a crystal in spite of a loss of lithium.

Practically, a good way to indicate the stoichimetry or the integrity of the crystal is to use the site occupancy of metal ions except lithium in the 3a site.

A charge/discharge reaction of the battery proceeds by reversibly desorbing and inserting lithium ions in the 3a site. However, when metal ions except lithium are added to the 3a site of a diffusion path for lithium in a solid phase, the diffusion path is obstructed. When the site occupancy of metal ions except lithium is over 2% in the 3a site, the diffusion path is often obstructed by the metal ions except lithium, so that sufficient capacity and output characteristics of the battery cannot be obtained. This may worsen the charge/discharge characteristics of the battery.

Accordingly, the site occupancy of metal ions except lithium is preferably 2% or less, and more preferably 1.5% or less in the 3a site.

(Shape of Particle)

The lithium nickel composite oxide, the cathode active material for a nonaqueous electrolyte secondary battery of the present invention, is particulate. The shape of the particle is preferably spherical or substantially spherical where a concept of spherical includes a spheroid.

With the spherical or substantially spherical shape, surface properties of the particles can be almost equal, so that a local reaction can be suppressed in the particles. Because of this, the cycle characteristics can be improved in the secondary battery having the positive electrode formed with the cathode active material of the present invention.

Additionally, with the spherical or substantially spherical shape, an output per volume of the battery can be improved because packing density of the cathode active material into the positive electrode can be enhanced.

(Particle Diameter and Particle Size Distribution)

According to the cathode active material of the present invention, it is preferable that an average particle diameter is 3 to 8 μm and a value represented by the expression of: [(d90−d10)/average particle diameter] as a marker indicating spreading of the particle size distribution is adjusted to be not more than 0.60.

With the particle diameter and the particle size distribution, high power characteristics and durability characteristics can be achieved in the secondary battery having the positive electrode formed with the cathode active material of the present invention.

When the average particle diameter is less than 3 μm, packing density of the particles is decreased in formation of the positive electrode to result in lowering the battery capacity per volume of the positive electrode.

On the other hand, when the average particle diameter is over 8 μm, a specific surface area of the cathode active material is decreased to result in decrease of the interface with the electrolytic solution of the battery, whereby a resistance of the positive electrode may be increased to result in deterioration of the output characteristics of the battery.

Accordingly, the average particle diameter is preferably adjusted to be 3 to 8 μm in the cathode active material of the present invention. An area for the reaction of lithium and an electrolyte can be increased on the surface of the cathode active material within the range, so that the high power can be achieved in the secondary battery having the positive electrode formed with the cathode active material of the present invention.

In the case where the particle size distribution falls within a broad range, in other words, a value represented by the expression of: [(d90−d10)/average particle diameter] is over 0.60, fine particles having a very small particle diameter relative to the average particle diameter, and particles having a very large particle diameter relative to the average particle diameter (large-diameter particle) are present in a large number.

When a positive electrode is formed with a cathode active material including a large number of fine particles, there is a possibility of heat generation due to a local reaction of the fine particles, whereby the safety may be reduced and the fine particles may selectively deteriorate, thus leading to inferior cycle characteristics.

On the other hand, when a positive electrode is formed with a cathode active material including a large number of large-diameter particles, the area for the reaction of the electrolytic solution and the cathode active material may not be provided sufficiently to lower the battery output by way of increase of a reaction resistance.

Therefore, making the particle size distribution uniform is preferable in the cathode active material of the present invention as the value represented by the expression of [(d90−d10)/average particle diameter] is not more than 0.60. The cycle characteristics can be further improved within the range because a redox reaction is equally performed in accordance with desorbing and inserting lithium ions in active material particles.

It is to be noted that in the expression of [(d90−d10)/average particle diameter] representing the value as a marker indicating spreading of the particle size distribution, when the numbers of particles of each particle diameter are accumulated from those of the smaller particle diameter, "d10" means a particle diameter in which an accumulation volume thereof accounts for 10% of the total volume of all the particles. Furthermore, when the numbers of particles of each particle diameter are accumulated from those of the smaller particle diameter, "d90" means a particle diameter in which the accumulation volume thereof accounts for 90% of the total volume of all the particles.

While methods for determining the average particle diameter, the "d90" and the "d10" are not particularly limited, for example, they may be determined from volume-integrated values determined with a laser diffraction scattering type particle size analyzer.

(Method for Producing Cathode Active Material for Nonaqueous Electrolyte Secondary Battery)

The method for producing the above cathode active material for a nonaqueous electrolyte secondary battery of the present invention is not particularly limited as long as it can be produced so as to have the aforementioned structure.

However, the cathode active material of the present invention can be certainly and effectively produced preferably with the method for producing a cathode active material for a nonaqueous electrolyte secondary battery according to the present invention (hereinafter, simply referred to as the method of the present invention), that is, the method comprising the steps of: heat treating a nickel cobalt aluminum composite hydroxide represented by a general formula: $Ni_{1-x-y}Co_xAl_y(OH)_2$ wherein $0<x\le0.30$, $0.03\le y\le0.15$; mixing the nickel cobalt aluminum composite hydroxide and/or nickel cobalt aluminum composite oxide, a lithium compound, and a titanium compound; and firing the mixture at 700 to 820° C. for 4 hours or more (FIG. 10).

The nickel cobalt aluminum composite hydroxide used for the method of the present invention is not particularly limited, whereas it is preferable to use nickel cobalt aluminum composite hydroxide whose average particle diameter is 3 to 7 μm, and a value represented by the expression of: [(d90−d10)/average particle diameter] as a marker indicating spreading of the particle size distribution is 0.55 or less.

With the above composite hydroxide, the particle diameter and the particle size distribution can be controlled strictly in the obtained cathode active material for a nonaqueous electrolyte secondary battery, thus leading to an ability to further improve the output characteristics and cycle characteristics.

(Method for producing Nickel Cobalt Aluminum Composite Hydroxide)

As a method for producing nickel cobalt aluminum composite hydroxide used for the method of the present invention, following methods can be employed. One is a spray drying method for spraying and drying slurry containing fine particles of the hydroxide with above composition, and the other is a neutralization crystallization method for crystallizing composite hydroxide by adding an alkaline aqueous solution to a mixed aqueous solution prepared by dissolving a plurality of metal compounds with above composition into water, followed by neutralization.

Generally, the neutralization crystallization method is roughly classified into a continuous method and a batch method, both of which can be employed.

Aluminum may be added to nickel cobalt composite hydroxide particles by covering a surface of the nickel cobalt composite hydroxide particles with aluminum hydroxide. For example, the surface of the nickel cobalt composite hydroxide particles can be covered with the aluminum hydroxide by slurrying the nickel cobalt composite hydroxide particles with an aqueous solution containing aluminum to deposit aluminum as a hydroxide on the surface of the composite hydroxide particles by a crystallization reaction.

(Batch Crystallization Method)

Preferably, a particle diameter and a particle size distribution are strictly controlled in the nickel cobalt aluminum composite hydroxide. A batch crystallization method is preferably employed to strictly control the particle diameter and the particle size distribution. More preferably, a nucleation step and a particle growth step for growing nuclei produced in the nucleation step are separated in the batch crystallization method to control the particle diameter and the particle size distribution.

That is, it is preferable to employ the method for producing the composite hydroxide having the nucleation step and the particle growth step. In the nucleation step, nucleation is carried out by controlling a pH of an aqueous solution for nucleation containing metal compounds including nickel and an ammonium ion donor to fall within the range of pH 12.0 to 13.4 in terms of the pH as measured at a liquid temperature of 25° C. as a standard, while in the particle growth step, nuclei grows by controlling a pH of an aqueous solution for particle growth containing the nuclei formed in the nucleation step to fall within the range of pH 10.5 to 12.0 in terms of the pH as measured at a liquid temperature of 25° C. as a standard.

Figure 8:
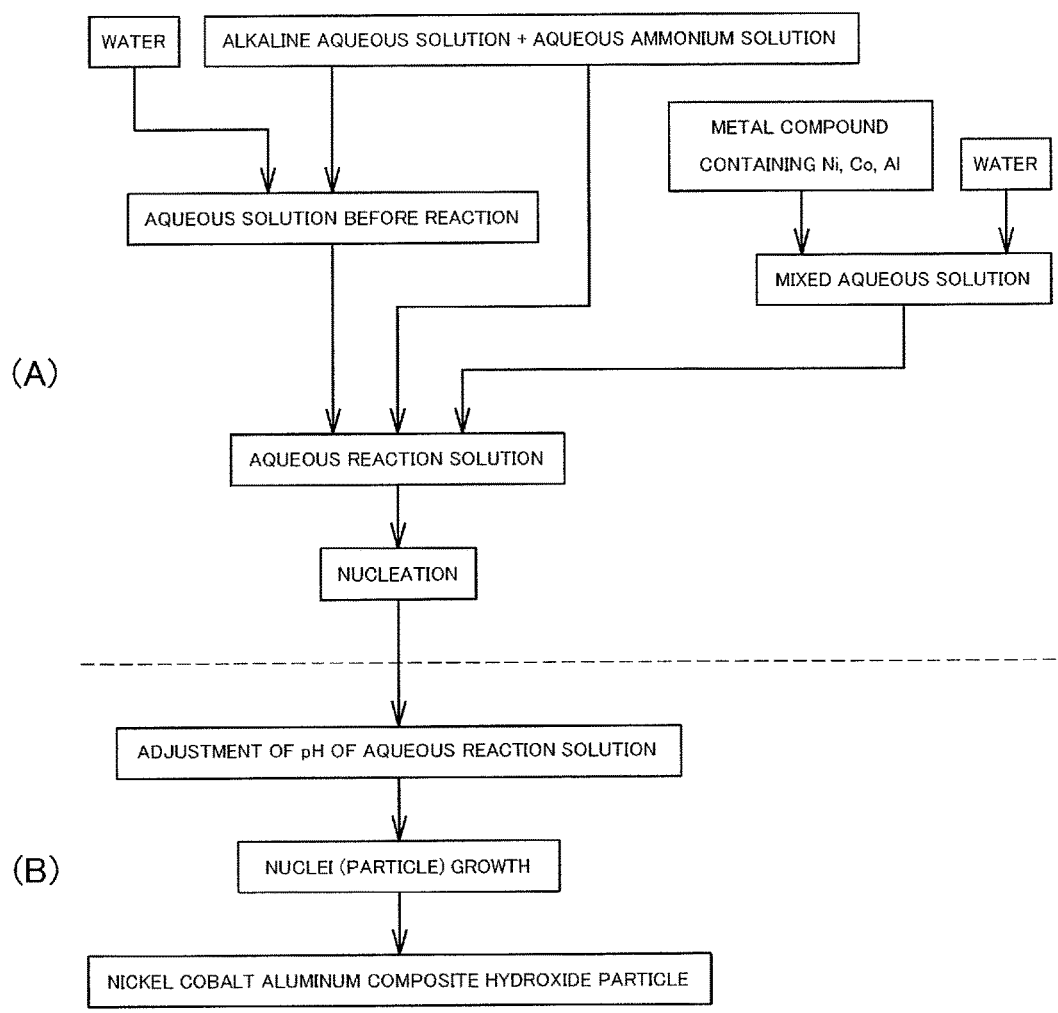
FIG. 8 is a schematic flow chart showing steps of producing a nickel composite hydroxide that is a raw material of a lithium nickel-containing composite oxide of the present invention.

Hereinafter, the batch crystallization method having the nucleation step and the particle growth step is described based on FIG. 8.

(Nucleation Step)

A plurality of metal compounds including nickel are dissolved first in water at a predetermined ratio to prepare a mixed aqueous solution. The composition ratio of each metal in the mixed aqueous solution becomes similar to the composition ratio of the composite hydroxide particles.

Meanwhile, an aqueous solution is prepared in a reaction chamber by supplying and mixing an alkaline aqueous solution such as a sodium hydroxide aqueous solution, an aqueous ammonia solution including an ammonium ion donor, and water.

This aqueous solution (hereinafter, referred to as "aqueous solution before the reaction") is prepared to have a pH thereof adjusted to fall within the range of pH 12.0 to 13.4 in terms of the pH as measured at a liquid temperature of 25° C. as a standard, by adjusting an amount of supplied alkaline aqueous solution. In the case of the pH higher than 13.4, nuclei to be formed become excessively fine to result in gelation of an aqueous reaction solution, while in the case of the pH lower than 12.0, a growth reaction of the nuclei occurs in accordance with forming the nuclei to result in widening a range of a particle size distribution of the nuclei to be formed.

An ammonium ion concentration in the aqueous solution before the reaction is adjusted concurrently to 3 to 25 g/L. Further, a temperature of the aqueous solution before the reaction is adjusted to fall within the range of 20 to 60° C. The pH and the ammonium ion concentration of the liquid in the reaction chamber can be measured with a common pH meter, and an ion meter, respectively.

Furthermore, when a condition of the aqueous solution before the reaction is adjusted, the mixed aqueous solution is supplied into the reaction chamber while the aqueous solution in the reaction chamber is stirred. Since an aqueous solution prepared by mixing the aqueous solution before the reaction and the mixed aqueous solution (hereinafter, referred to as aqueous reaction solution) is formed in the reaction chamber, very fine nuclei of the composite hydroxide are produced. This aqueous reaction solution is maintained on the condition described above; therefore, production of the nuclei occurs preferentially, and the fine nuclei hardly grow.

Since the nucleation is accompanied by change in the pH and the ammonium ion concentration of the aqueous reaction solution, an alkaline aqueous solution and an aqueous ammonia solution are supplied to the aqueous reaction solution to control the predetermined condition so as to be maintained.

When the mixed aqueous solution, the alkaline aqueous solution and the aqueous ammonia solution are successively supplied into the reaction chamber, production of additional nuclei persists continuously in the aqueous reaction solution. Subsequently, when the nuclei are produced by a predetermined amount, the nucleation step is terminated.

(Particle Growth Step)

After completing the nucleation step, the method proceeds to the particle growth step where the pH of the aqueous reaction solution is adjusted to fall within the range of pH 10.5 to 12.0 in terms of the pH as measured at a liquid temperature of 25° C. as a standard. Specifically, the pH of the aqueous reaction solution is controlled by adjusting the amount of the supplied alkaline aqueous solution.

The reasons why the pH is within the above range is that sufficiently grown particles cannot be obtained due to a large number of the additional nuclei in the case of the pH higher than 12.0, while metal ions remaining in the solution without crystallization increases due to high solubility caused by ammonia ions in the case of the pH lower than 10.5. These things are not preferable.

Accordingly, with the pH of the aqueous reaction solution within the above range in the particle growth step, not the nucleation reaction but the growth reaction of the nuclei preferentially occurs and additional nuclei are hardly produced in the aqueous solution. As a result, the composite hydroxide particles with a predetermined particle diameter can be formed.

As described above, nucleation preferentially occurs while the nuclei growth hardly occurs in the nucleation step, and to the contrary, only the nuclear growth occurs while additional nuclei are hardly produced in the particle growth step. Thus, uniform nuclei having a narrow range of the particle size distribution can be formed in the nucleation step, whereas nuclei can be homogenously grown in the particle growth step. Therefore, uniform nickel composite hydroxide particles having a narrow range of the particle size distribution can be obtained.

In the case of the method described above, since the metal ions are crystallized in both steps, the mixed aqueous solution to be supplied seems to have the concentration apparently decreased with respect to the aqueous reaction solution, and there is possibility of failure in sufficient growth of the composite hydroxide particles in the particle growth step. Therefore, after completing the nucleation step, or during the particle growth step, a part of the aqueous reaction solution may be discharged out from the reaction chamber to increase the concentration of the mixed aqueous solution to be supplied with respect to the aqueous reaction solution.

Figure 9:
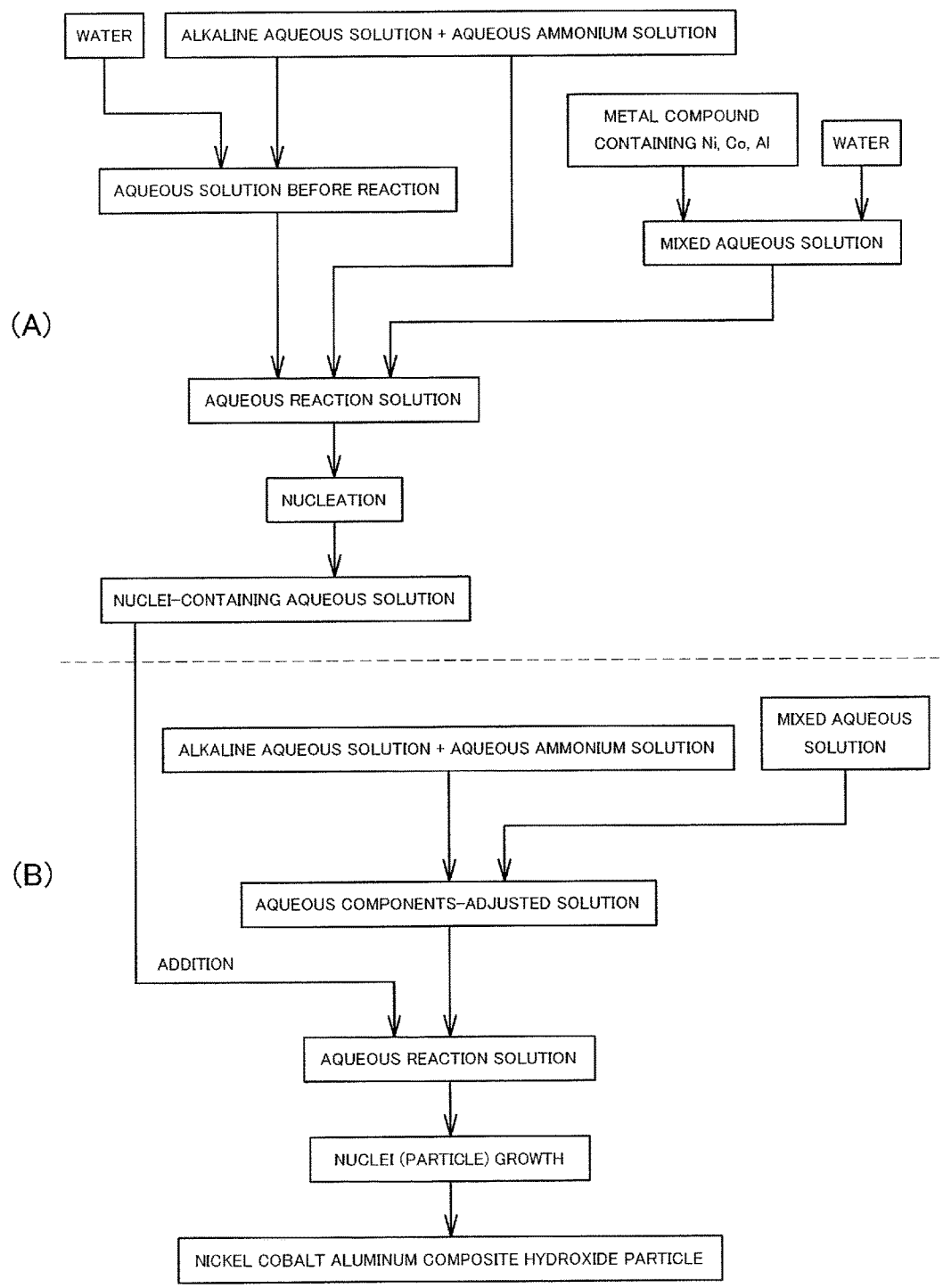
FIG. 9 is a schematic flow chart showing other steps of producing the nickel composite hydroxide that is a raw material of the lithium nickel-containing composite oxide of the present invention.

In the case of performing the above method, the pH may be adjusted to prepare the aqueous solution for particle growth after completing the nucleation step in the same reaction chamber. Also, an aqueous components-adjusted solution having a pH and an ammonium ion concentration adjusted to be suited for the particle growth step is prepared separately from the aqueous solution for nucleation. Then, an aqueous reaction solution may be prepared by adding to this aqueous components-adjusted solution an aqueous solution containing the nuclei that has been subjected to the nucleation step in another reaction chamber, thus carrying out the particle growth step therewith. In this case, separation of the nucleation step and the particle growth step can be more certainly ensured; therefore, the state of the aqueous reaction solution in each step can fall under the optimum condition for each step (FIG. 9).

(Metal Compounds)

As metal compounds used for the method, any compound containing an intended metal is used, however, the compounds to be used are preferably water soluble compounds. Examples of the compound include nitrate, sulfate and hydrochloride. For example, nickel sulfate and cobalt sulfate are preferably used. When the mixed aqueous solution is prepared, each metal compound is adjusted such that the ratio of the number of atoms of the metal ions in the mixed aqueous solution agrees with the ratio of the number of atoms of the metal ions in the intended composite hydroxide.

While the metal compounds are not particularly limited and nitrate, sulfate and chloride are used, sulfate is preferable. Also, sodium aluminate is preferably used as an aluminum compound in addition to the aforementioned salt.
(Ammonia Concentration)

In the reaction chamber, the ammonia concentration in the aqueous reaction solution is maintained at a constant value in the range of preferably 3 to 25 g/L so as not to cause the following problems.

Ammonia acts as a complexing agent, and when the ammonia concentration is less than 3 g/L, solubility of the metal ions cannot be kept constant. Therefore, platy hydroxide primary particles having regulated shapes and particle diameters cannot be formed, and gelatinous nuclei are likely to be produced, so that the particle size distribution is apt to be broad.

On the other hand, when the ammonia concentration is over 25 g/L, solubility of the metal ions becomes excessively high, whereby the amount of the metal ions remaining in the aqueous reaction solution increases to cause deviation of the composition and the like. When the ammonia concentration varies, solubility of the metal ions also varies, thereby leading to failure in formation of uniform hydroxide particles; therefore, maintaining the ammonia concentration at a constant value is preferred.

It should be noted that the ammonium ion donor is not particularly limited, but for example, ammonia, ammonium sulfate, ammonium chloride, ammonium carbonate, ammonium fluoride and the like may be used.
(Reaction Atmosphere)

While an atmosphere during the reaction is not particularly limited, excessive oxidizing atmosphere is not preferred for ensuring stable production. Therefore, with respect to the atmosphere during the reaction, an oxygen concentration is preferably lower than an oxygen concentration in the air. For example, by carrying out the crystallization reaction while controlling the oxygen concentration in the space within the reaction chamber at not more than 10%, unnecessary oxidization of the particles is suppressed, whereby particles having an even particle size can be obtained.

To control the oxygen concentration in the space within the reaction chamber is preferably performed at least in the particle growth step. Furthermore, means for maintaining the space of the reaction chamber like this condition may include allowing an inert gas such as nitrogen to constantly flow in the chamber.
(Shape of Particle)

In the cathode active material of the present invention, since a shape of a particle is preferably spherical or spheroidal in order to achieve high packing density, a shape of a secondary particle is also preferably spherical or spheroidal in the composite hydroxide. The shape of the secondary particle in the obtained composite hydroxide according to the above crystallization method is made spherical or spheroidal, which is preferred.
(Heat Treatment Step)

As shown in FIG. 10, the nickel cobalt aluminum composite hydroxide is heat-treated in the method for producing the cathode active material for a nonaqueous electrolyte secondary battery of the present invention. The heat treatment allows moisture remaining in the composite hydroxide particles to be reduced, thereby preventing variation of a composition of the cathode active material to be produced.

In the heat treatment step, not all the composite hydroxide particles must be converted into the composite oxide particles. It is acceptable that the moisture can be removed to the extent that variation of the composition of the finally obtained cathode active material does not occur. However, a forming reaction of lithium composite oxide can effectively occur in a firing step of the following step with using the composite oxide in the firing step. Because of this, the more the amount of the composite hydroxide converted into the composite oxide, the more preferable.

The heat treatment temperature is not particularly limited but is preferably 105 to 800° C. The temperature lower than 105° C. is not industrially adequate since a long time period is required for removing residual moisture. The temperature higher than 800° C. may cause aggregation by sintering of the particles that have been converted into the composite oxide.

The atmosphere in which the heat treatment is carried out is not particularly limited, and the treatment is preferably carried out in an airflow conveniently adopted.

Additionally, the heat treatment time period is not particularly limited, but is preferably at least 1 hour or longer, and more preferably 5 to 15 hours because the time period of shorter than 1 hour may lead to failure in sufficiently removing the residual moisture in the composite hydroxide particles.
(Mixing Step)

Next, a lithium compound and a titanium compound are mixed with the nickel cobalt aluminum composite hydroxide or nickel cobalt aluminum composite oxide after the heat treatment.

With respect to a mixing ratio of the lithium compound to the composite hydroxide or composite oxide, the ratio of the number of atoms of lithium (Li) to the number of atoms of metal except lithium, or the sum of the number of atoms of nickel, cobalt, aluminum and titanium (Me) (hereinafter, the ratio is referred to as "Li/Me") is 0.98 to 1.10. That is, the mixing is carried out such that Li/Me in a lithium mixture becomes the same as Li/Me in the cathode active material of the present invention.

There is a case where washing is carried out after firing as described below. Since lithium is slightly eluted by the washing, more lithium compounds are mixed accordingly. For example, the mixing is carried out such that the ratio of the number of atoms of lithium (Li) to the number of atoms of metal except lithium (Me) becomes on the order of 0.02 to 0.05 larger, i.e. becomes on the order of 1.0 to 1.15.

The mixing the titanium compound, and the composite hydroxide or composite oxide is carried out such that the composition ratio thereof becomes the same as the composition ratio in the cathode active material of the invention. This may be carried out either simultaneously with the mixture of the lithium compound or separately.

The mixing is preferably carried out sufficiently before firing in either case. When the mixing is not sufficient, it is probable to cause problems such as variation of the composition among individual particles, failure in achieving sufficient battery characteristics, and the like.

Additionally, a general mixer may be used for the mixing. For example, a shaker mixer, Loedige mixer, JULIA mixer, V blender or the like may be used to sufficiently mix the lithium compound and the titanium compound to the extent that external shapes of the composite hydroxide particles, the composite oxide particles, and the like are not broken.

Further, the compounds to be mixed are not particularly limited. Examples of the lithium compound include lithium carbonate, lithium hydroxide, lithium hydroxide monohydrate, lithium nitrate and lithium peroxide, while examples of the titanium compound include titanium oxide and titanium chloride in addition to titanium metal.
(Firing Step)

Hexagonal lithium-containing composite oxide with a layer structure can be obtained by firing (heat treating) the obtained mixture in the mixing step.
(Firing Temperature)

The firing temperature is preferably 700 to 820° C.

When the firing temperature is lower than 700° C., crystallinity of the obtained lithium-containing composite oxide is low, whereby a problem of failure in achieving sufficient battery characteristics is caused.

On the other hand, when the firing temperature is over 820° C., occurrence of sintering among the particles and particle growth causes the particles after firing to become coarse. This results in a problem of lowering the battery output characteristics because the specific surface area is decreased to increase a resistance of the positive electrode.

In particular, the output characteristics are to be improved in the cathode active material of the present invention by forming a titanium-enriched layer on a particle surface of the lithium-containing composite oxide. Therefore, the firing temperature is preferably over 750° C. and not higher than 800° C. in order to form the titanium-enriched layer sufficiently.

This is because the titanium-enriched layer may not be formed sufficiently with the firing temperature of 750° C. or less, while the formed titanium-enriched layer dissolves in the lithium-containing composite oxide to result in a possibility of not forming the titanium-enriched layer sufficiently with the firing temperature over 800° C.
(Firing Time Period)

A firing time period is preferably at least for 4 hours or longer, and more preferably, 6 to 24 hours. When the firing time period is shorter than 4 hours, production of the lithium-containing composite oxide may be insufficient, so may be formation of the titanium-enriched layer.
(Calcination)

When a lithium hydroxide, lithium carbonate or the like is used as the lithium compound, in particular, calcination may be carried out by keeping the lithium mixture at a temperature of 350 to 550° C. for about 1 to 10 hours before firing. By the calcination at a melting point of the lithium hydroxide or the lithium carbonate, or a reaction temperature, diffusion of lithium in the composite hydroxide particles or the composite oxide particles can be sufficiently carried out. As a result, uniform lithium nickel composite oxide can be obtained.
(Firing Atmosphere)

Preferably, oxygen concentration is 18 to 100% by volume in an atmosphere in firing. In other words, the firing is preferably carried out in an ambient air or an oxygen flow. When the oxygen concentration is less than 18% by volume, the nickel composite hydroxide particles included in the heat-treated particles cannot be sufficiently oxidized, and thus crystallinity of the lithium nickel composite oxide may not be sufficient. Considering the battery characteristics particularly, the firing is preferably carried out in an oxygen flow.

A furnace used in the firing is not particularly limited, and any furnace enabling the lithium mixture to be heated in an ambient air or oxygen flow is acceptable. However, an electric furnace not accompanied by gas generation is preferable, and either one of batch type or continuous type furnace may be used.

While the cathode active material of the present invention can be produced according to the above production method, it can also be produced by heat treating nickel cobalt aluminum titanium composite hydroxide represented by $Ni_{1-x-y-z}Co_xAl_yTi_z(OH)_2$ wherein $0<x\leq0.30$, $0.03\leq y\leq0.15$, $0.001\leq z\leq0.03$; mixing the nickel cobalt aluminum titanium composite hydroxide or nickel cobalt aluminum titanium composite oxide, and a lithium compound; and firing the mixture at 700 to 820° C. for 4 hours or more.

In other words, the lithium-containing composite oxide may be formed with composite hydroxide including titanium as a raw material instead of adding the titanium compound in the mixing step.

Specifically, the composite hydroxide including titanium can be formed by dissolving a predetermined amount of titanium compounds in a mixed aqueous solution when the composite hydroxide is formed by crystallization.

In the case where the composite hydroxide including above titanium includes the predetermined amount of titanium, there is no necessity to add the titanium compound in the mixing step. However, the amount of titanium in the lithium-containing composite oxide may be adjusted to meet a predetermined amount by adding the amount of titanium included in the composite hydroxide to the titanium compound added in the mixing step.
(Washing with Water)

The lithium-containing composite oxide obtained by firing is preferably washed with water if thermal stability of the cathode active material of the present invention is further improved and high capacity is achieved in the secondary battery having the positive electrode formed with the cathode active material.

Carrying out the washing makes it possible to wash away unnecessary, impurities and by-products on the surface of the cathode active material, thereby being able to sufficiently display an effect of the titanium-enriched layer that is a feature of the present invention.

Moreover, the existence of the titanium-enriched layer can suppress elution of lithium in washing. Therefore, when a positive electrode is formed with the washed cathode active material of the present invention, thermal stability of the secondary battery can be improved and high capacity thereof can also be achieved.

The washing can be carried out by a known method, for example, a method for adding water to the cathode active material of the present invention, followed by filtration.
(Nonaqueous Electrolyte Secondary Battery)

The nonaqueous electrolyte secondary battery of the present invention (hereinafter, simply referred to as "the secondary battery of the present invention") has a structure substantially the same as the structure of general nonaqueous electrolyte secondary batteries except that the cathode active material of the present invention is used as a material of the positive electrode.

Specifically, the secondary battery of the present invention has a structure provided with a case, and a positive electrode, a negative electrode, a nonaqueous electrolytic solution and a separator enclosed in the case. More specifically, the secondary battery of the present invention is formed by: laminating the positive electrode and the negative electrode via the separator to form an electrode assembly; impregnating thus obtained electrode assembly with a nonaqueous electrolytic solution; connecting between a positive electrode collector of the positive electrode and a positive electrode terminal communicating with the exterior, and between a negative electrode collector of the negative electrode and a negative electrode terminal communicating with the exterior using leads for power collection or the like; and sealing the case.

It should be noted that the structure of the secondary battery of the present invention is not limited to the above example, and a variety of forms may be employed for the external configuration such as a cartridge, stacked form or the like.

(Structure of Each Part)

Next, each part of the secondary battery of the present invention is described.

(Positive Electrode)

First, the positive electrode exhibiting a feature of the secondary battery of the present invention is described below.

The positive electrode of a sheet-shaped member is formed by coating, for example, a surface of a collector made of an aluminum foil with a positive electrode mixture paste including the cathode active material of the present invention, followed by drying.

The positive electrode is subjected to a treatment appropriately depending on the battery to be used. For example, following treatments may be carried out such as a cutting treatment for formation so as to have an appropriate size depending on the intended battery, and a compression treatment by roll pressing or the like for increasing electrode density.

(Positive Electrode Mixture Paste)

The positive electrode mixture paste is prepared by adding a solvent to the positive electrode mixture, followed by kneading.

The positive electrode mixture is prepared by mixing the cathode active material of the present invention in a powdery form with a conductive material and a binder.

The conductive material is added for imparting an adequate electric conductivity to the electrode. While this conductive material is not particularly limited, for example, graphite (natural graphite, artificial graphite and expanded graphite, etc.), or a carbon black based material such as acetylene black or Ketjen black may be used.

The binder serves to bind the cathode active material particles. While the binder used for the positive electrode mixture is not particularly limited, for example, polyvinylidene fluoride (PVDF), polytetrafluoroethylene (PTFE), fluorine rubber, ethylene-propylenediene rubber, styrene-butadiene rubber, cellulose based resin and polyacrylic acid may be used.

An activated charcoal and the like may be added to the positive electrode mixture, which can increase electric double layer capacity of the positive electrode.

The solvent dissolves the binder to allow the cathode active material, the conductive material, the activated charcoal and the like to disperse in the binder. While this solvent is not particularly limited, for example, an organic solvent such as N-methyl-2-pyrrolidone may be used.

Moreover, a mixing ratio of each substance in the positive electrode mixture paste is not particularly limited. For example, provided that the solid content of the positive electrode mixture excluding the solvent is 100 parts by mass, a content of the cathode active material may be 60 to 95 parts by mass, a content of the conductive material may be 1 to 20 parts by mass, and a content of the binder may be 1 to 20 parts by mass, similarly to the case of positive electrodes of general nonaqueous electrolyte secondary batteries.

(Negative Electrode)

The negative electrode is a sheet member formed by coating a surface of a metal foil collector such as copper with a negative electrode mixture paste, followed by drying. Although components of the negative electrode mixture paste, a blend thereof and a material of the collector are different from those of the positive electrode, this negative electrode is formed by a substantially similar manner to the positive electrode described above, and subjected to various types of treatments as needed also similarly thereto.

The negative electrode mixture paste is prepared in a paste form by adding a suitable solvent to a negative electrode mixture prepared by mixing a negative-electrode active material and a binder.

As the negative-electrode active material, for example, a substance containing lithium such as metal lithium or a lithium alloy, or an occlusion substance in and from which lithium ions are occluded and desorbed may be employed.

While the occlusion substance is not particularly limited, for example, natural graphite, artificial graphite, fired products of an organic compound such as a phenol resin, and powdery matter of a carbon substance such as coke may be used. When such an occlusion substance is employed in the negative-electrode active material, a fluorocarbon-containing resin such as PVDF may be used as a binder similarly to the positive electrode, and an organic solvent such as N-methyl-2-pyrrolidone may be used as a solvent for dispersing the negative-electrode active material in the binder.

(Separator)

A separator is disposed to be sandwiched between the positive electrode and the negative electrode, thereby separating the positive electrode from the negative electrode, and has a function to retain the electrolyte. As such a separator, a thin membrane of, for example, a polyethylene or polypropylene having a large number of very fine pores may be used; however, not particularly limited thereto as long as it has the aforementioned function.

(Nonaqueous Electrolytic Solution)

The nonaqueous electrolytic solution is prepared by dissolving a lithium salt as a supporting salt in an organic solvent.

Examples of the organic solvent include cyclic carbonates such as ethylene carbonate, propylene carbonate, butylene carbonate and trifluoropropylene carbonate; chain carbonates such as diethyl carbonate, dimethyl carbonate, ethylmethyl carbonate and dipropyl carbonate; as well as ether compounds such as tetrahydrofuran, 2-methyltetrahydrofuran and dimethoxyethane; sulfur compounds such as ethylmethylsulfone and butanesulfone; and phosphorus compounds such as triethyl phosphate and trioctyl phosphate. One alone, or at least two as a mixture selected from these may be used.

As a supporting salt, $LiPF_6$, $LiBF_4$, $LiClO_4$, $LiAsF_6$, $LiN(CF_3SO_2)_2$, and composite salts thereof may be used.

Still more, the nonaqueous electrolytic solution may contain a radical scavenger, a surfactant, a fire retardant and the like for improving battery characteristics.

(Characteristics of Secondary Battery of the Present Invention)

Since the secondary battery of the present invention has the above configuration and the aforementioned positive electrode is used therein, a high initial discharge capacity not less than 170 mAh/g and a low positive electrode resistance not more than $4.0\Omega$ are attained, whereby a high power and high capacity are achieved. Also, in comparison with conventional cathode active materials of lithium nickel oxide, superior thermal stability and excellent safety are suggested.

(Application of Secondary Battery of the Present Invention)

The secondary battery of the present invention is suitable for electric power supplies of small-size mobile electronic devices that consistently require a high capacity (notebook-sized personal computers, mobile phone terminals, etc.), because of the aforementioned properties.

Moreover, the secondary battery of the present invention is also suitable for batteries for electric automobiles that require a high power. When a battery for electric automobiles has a larger size, securing safety may be difficult and providing an expensive protective circuit is essential. However, the secondary battery of the present invention not only facilitates securing of the safety but simplifies an expensive protective circuit to enable the cost to be reduced because the battery has excellent safety without increasing the size. Additionally, since size reduction and increase of the output are possible, the present battery is suitable for an electric power supply for electric automobiles having limited mounting space.

The secondary battery of the present invention can be used not only as an electric power supply for electric automobiles exclusively driven by electric energy, but also as an electric power supply for so-called hybrid automobiles in which a combustion engine such as a gasoline engine or diesel engine is used in combination.

EXAMPLES

With respect to a secondary battery having a positive electrode produced by using a cathode active material according to the method of the present invention, the performances (initial discharge capacity, cycle capacity retention rate, and positive electrode resistance) thereof were ascertained.

Hereinafter, the present invention is specifically described with the Examples, but the present invention is not any how limited to these Examples.

(Measurement of Average Particle Diameter and Particle Size Distribution)

An average particle diameter and particle size distribution of the composite hydroxide and the cathode active material were calculated from the volume-integrated value measured by a laser diffraction scattering type particle size distribution measuring apparatus (Microtrack HRA, manufactured by Nikkiso Co., Ltd.).

(Measurement of Site Occupancy of Metal Ion)

A crystal structure was ascertained by X-ray diffraction measurement (X'Pert PRO, manufactured by PANalytical Inc.), and a site occupancy of metal ions except lithium in a 3a site was derived by carrying out Rietveld refinement of the obtained diffraction pattern.

(Analysis of Composition)

Compositions of the obtained composite hydroxide and cathode active material were ascertained by an ICP emission spectrometry after dissolving the sample.

(Production of Secondary Battery)

For the evaluation, a 2032 type coin battery shown in FIG. 4 (hereinafter, referred to as a coin type battery 1) was used.

Figure 4:
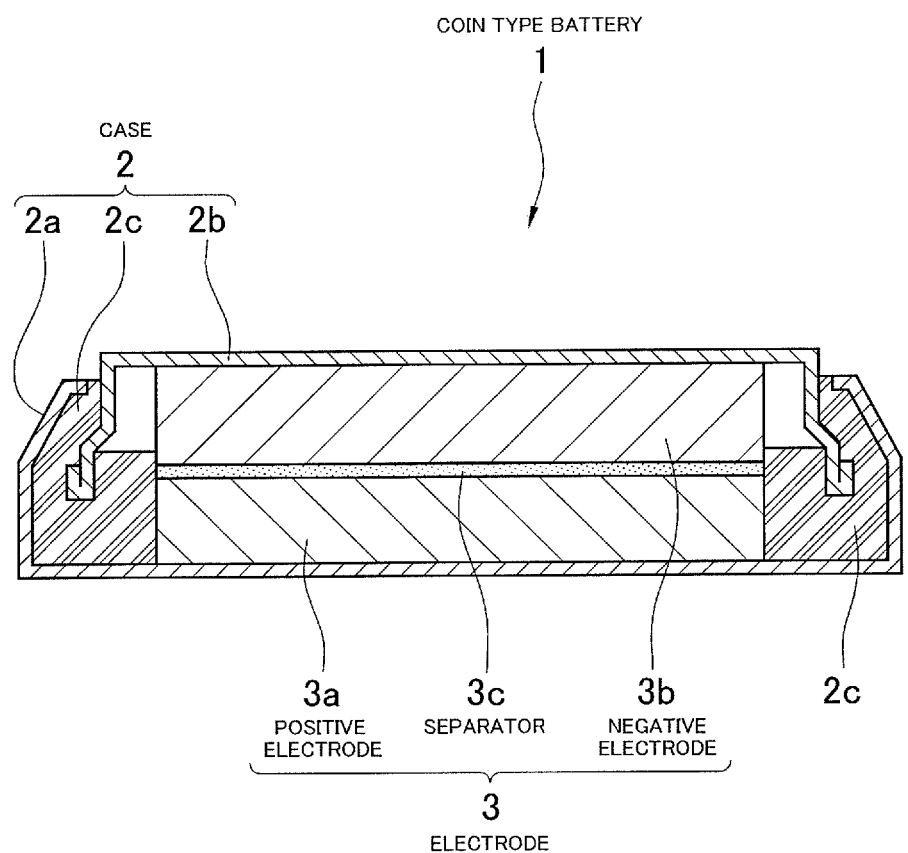
FIG. 4 is a schematic cross sectional view illustrating a coin type battery 1 used for evaluating the battery.

As shown in FIG. 4, the coin type battery 1 includes a case 2 and an electrode 3 housed in this case 2.

The case 2 has a hollow and one-end opened positive electrode can 2a and a negative electrode can 2b disposed at the opening of this positive electrode can 2a. A space for housing the electrode 3 is formed between the negative electrode can 2b and the positive electrode can 2a when the negative electrode can 2b is disposed at the opening of the positive electrode can 2a.

The electrode 3 includes a positive electrode 3a, a separator 3c and a negative electrode 3b, which are laminated in this order. This electrode 3 is housed in the case 2 such that the positive electrode 3a is in contact with an inner face of the positive electrode can 2a and that the negative electrode 3b is in contact with an inner face of the negative electrode can 2b.

The case 2 has a gasket 2c, which fixes relative movement so as to keep the positive electrode can 2a and the negative electrode can 2b in noncontact manner. Additionally, the gasket 2c also has a function to tightly seal a gap between the positive electrode can 2a and the negative electrode can 2b to air-tightly and liquid-tightly block the inside of the case 2 from the exterior.

The coin type battery 1 as described above was produced as in the following.

First, 52.5 mg of a cathode active material for a nonaqueous electrolyte secondary battery, 15 mg of acetylene black, and 7.5 mg of a polytetrafluoroethylene resin (PTFE) were mixed, and the mixture was subjected to press molding at a pressure of 100 MPa to form into a piece having a diameter of 11 mm and a thickness of 100 μm, whereby the positive electrode 3a was produced. Then, the produced positive electrode 3a was dried in a vacuum drier at 120° C. for 12 hours.

Using this positive electrode 3a, the negative electrode 3b, the separator 3c and an electrolytic solution, the coin type battery 1 described above was produced in a glove box provided with an Ar atmosphere in which a dew point had been controlled at −80° C.

As the negative electrode (2), a negative electrode sheet was used which had been produced by coating a copper foil punched to have a discoid shape having a diameter of 14 mm with graphite powder having an average particle diameter of about 20 μm and polyvinylidene fluoride. As the separator (3), a polyethylene porous membrane having a film thickness of 25 μm was used. As the electrolytic solution, used was an equal volume mixture of ethylene carbonate (EC) and diethyl carbonate (DEC) with a supporting electrolyte of 1 M $LiClO_4$ (manufactured by TOMIYAMA PURE CHEMICAL INDUSTRIES, Ltd.).

The initial discharge capacity, the cycle capacity retention rate and the positive electrode resistance for evaluating performances of the produced coin type battery 1 are defined as follows.

For determining the initial discharge capacity, the coin type battery 1 was left to stand for about 24 hours following production. After an open circuit voltage (OCV) was stabilized, the coin type battery 1 was charged with an electric current density to the positive electrode 0.1 $mA/cm^2$ up to a cut-off voltage of 4.3 V. After pausing for 1 hour, the coin type battery was discharged down to a cut-off voltage of 3.0 V and a capacity at that time was determined as an initial discharge capacity.

For determining the cycle capacity retention rate, the coin type battery 1 was charged and discharged with an electric current density to the positive electrode 2 $mA/cm^2$, and a cycle of charging up to 4.2 V and discharging down to 3.0 V was repeated 500 times. A ratio of the discharge capacity after repeating the charge and discharge to the initial discharge capacity was calculated to determine as a capacity retention rate. For the measurement of the charge and discharge capacities, a multichannel voltage/electric current generator (R6741A, manufactured by Advantest Corporation) was used.

Figure 5:
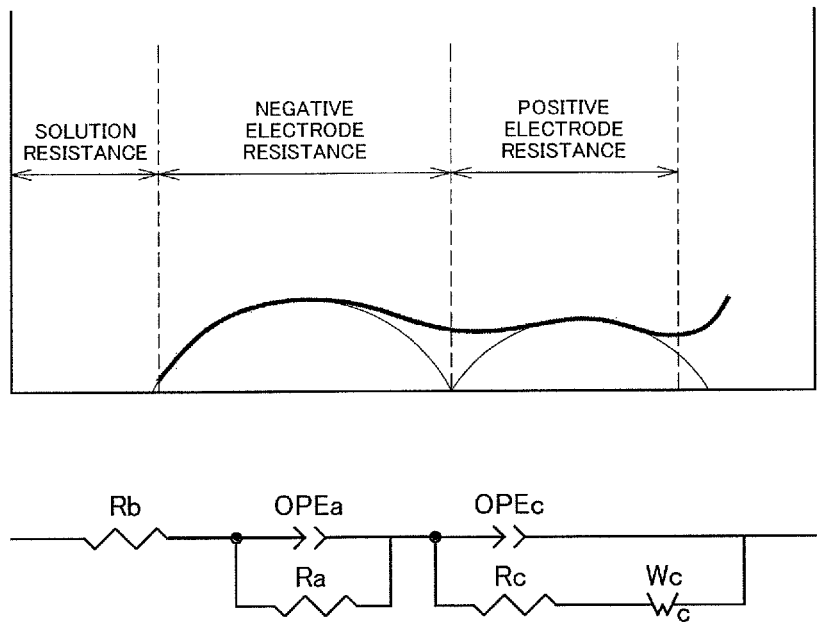
FIG. 5 shows an example of measurement for evaluation of an impedance, and a schematic diagram of an equivalent circuit used in analysis.

Further, for the positive electrode resistance, the coin type battery 1 was charged at a charging potential of 4.0 V, and then a frequency response analyzer and a Potentio/Galvanostat (1255B, manufactured by Solartron) were used for measurement with an alternating current impedance method to obtain a Nyquist plot shown in FIG. 5. This Nyquist plot illustrates the sum of characteristic curves showing a solution resistance, a negative electrode resistance and a capacity thereof, and a positive electrode resistance and a capacity thereof. Therefore, a value of the positive electrode resistance was determined using an equivalent circuit based on this Nyquist plot by fitting calculation.

In Examples of the present invention, special grade reagents manufactured by Wako Pure Chemical Industries, Ltd. were used for producing composite hydroxides, cathode active materials and secondary batteries.

Example 1

A reaction chamber of 34 L was filled half full of water. Thereafter, while stirring the water, a temperature in the chamber was set to 40° C., and nitrogen gas was introduced into the reaction chamber to form a nitrogen atmosphere. At that time, a concentration of oxygen in the space of the reaction chamber was 2.0%.

A 25% aqueous sodium hydroxide solution and a 25% aqueous ammonia were appropriately added into water in the reaction chamber, and an aqueous solution before the reaction in the chamber was adjusted to have a pH of 12.2 in terms of the pH as measured at a liquid temperature of 25° C. as a standard. Additionally, an ammonia concentration in the aqueous solution before the reaction was adjusted to 15 g/L.

Next, nickel sulfate and cobalt sulfate were dissolved in water to form a 1.8 mol/L mixed aqueous solution. In this mixed aqueous solution, a molar ratio of each metal element was adjusted to be Ni:Co=0.745:0.14.

The mixed aqueous solution was added to the aqueous solution before the reaction in the reaction chamber at a rate of 88 ml/min. Concurrently, a 25% aqueous ammonia and a 25% aqueous sodium hydroxide solution were also added to the aqueous solution before the reaction in the reaction chamber at a constant rate. Then, nucleation was carried out by a crystallization for 2 min and 30 sec while the ammonia concentration in an aqueous reaction solution was maintained at the aforementioned value with the pH controlled at 12.2 (pH for nucleation).

Thereafter, supply of only the 25% aqueous sodium hydroxide solution was temporarily stopped until the pH of the aqueous reaction solution became 11.2 (pH for particle growth) in terms of a pH as measured at a liquid temperature of 25° C. as a standard.

After the pH of the aqueous reaction solution reached 11.2 in terms of a pH as measured at a liquid temperature of 25° C. as a standard, supply of the 25% aqueous sodium hydroxide solution was started again to permit particle growth by continuing the crystallization for 2 hours with the pH controlled at 11.2.

When the reaction chamber was filled up, the crystallization was terminated and the stirring was stopped, and the reaction solution was stood still to induce precipitation of the product. Subsequently, after a half amount of supernatant was drawn out from the reaction chamber, crystallization was started again and carried out for 2 hours (for 4 hours in total), and then the crystallization was completed. Thereafter, the product was washed with water and filtrated to obtain particles.

The obtained particles were transferred to another reaction chamber and mixed with water at an ordinary temperature to form a slurry. To this mixed aqueous solution were added an aqueous solution of sodium aluminate, and sulfuric acid while stirring to adjust the pH of the slurry to 9.5.

Thereafter, a surface of nickel cobalt composite hydroxide particles was covered with aluminum hydroxide by continuing stirring for 1 hour. At that time, the aqueous solution of sodium aluminate was added such that a molar ratio of metal elements of Ni:Co:Al in the slurry became 0.745:0.14:0.1.

After the stirring was stopped, the aqueous solution was filtered and the particles covered with the aluminum hydroxide were washed with water to obtain a composite hydroxide. Measurement of a particle size distribution of the obtained composite hydroxide particles verified that an average particle diameter was 4.6 μm, and that a value represented by the expression of: [(d90−d10)/average particle diameter] was 0.48. According to results of observation of the obtained composite hydroxide particles with an SEM (scanning electron microscope S-4700, manufactured by Hitachi High-Technologies Corporation), it was ascertained that the obtained composite hydroxide particles were substantially spherical, and had an almost even particle diameter.

The composite hydroxide particles were subjected to a heat treatment in an air flow (oxygen: 21% by volume) at a temperature of 700° C. for 6 hours, and the composite oxide particles were recovered.

Lithium hydroxide was weighed such that a ratio of Li/Me became 1.06, and further, titanium oxide powder was weighed such that a molar ratio of metal elements of Ni:Co:Al:Ti became 0.745:0.14:0.10:0.005. Then, the recovered composite oxide particles were mixed therewith to form a mixture. The mixing was carried out using a shaker-mixer apparatus (TURBULA® Type T2C, manufactured by Willy A. Bachofen (WAB) AG).

The obtained mixture was subjected to calcination in an oxygen flow (oxygen: 100% by volume) at 500° C. for 9 hours, thereafter fired at 760° C. for 10 hours, and cooled followed by disintegrating. The obtained lithium-containing composite oxide was regarded as a cathode active material. An average particle diameter of the obtained cathode active material was 4.6 μm, and a value represented by the expression of: [(d90−d10)/average particle diameter] was 0.47. A powder X-ray diffraction analysis of the obtained cathode active material with a Cu—Kαray revealed that the material had a single phase of a hexagonal layered crystal. Furthermore, a chemical analysis of the cathode active material indicated to be $Li_{1.06}Ni_{0.745}Co_{0.14}Al_{0.1}Ti_{0.005}O_2$. Additionally, Rietveld refinement was carried out with respect to an X ray diffraction pattern, so that a site occupancy of metal ions except lithium in a 3a site was calculated to be 1%.

According to an SEM photograph (FIG. 1), or results of observation of the cathode active material with an scanning electron microscope (scanning electron microscope S-4700, manufactured by Hitachi High-Technologies Corporation, hereinafter referred to as SEM), it was ascertained that the composite oxide particles were substantially spherical, and had an almost even particle diameter.

A coin type battery 1 having a positive electrode formed with the cathode active material was subjected to a charge and discharge test, which revealed that the coin type battery 1 had an initial discharge capacity of 172.9 mAh/g and a capacity retention rate after 500 cycles of 90%. Additionally, a positive electrode resistance was shown to be 3.5 Q. FIGS. 6 and 7 show the site occupancies of metal ions except lithium, the initial discharge capacities, the positive electrode resistances and the capacity retention rates after 500 cycles.

With regard to Examples 2 to 10 and Comparative Examples 1 to 5 below, only the substances and conditions changed from the aforementioned Example 1 are referred to.

In addition, results of each evaluation of Examples 2 to 10 and Comparative Examples 1 to 5 are shown in FIGS. 6 and 7.

Example 2

A cathode active material for a nonaqueous electrolyte secondary battery was obtained and evaluated in a similar manner to Example 1 except that the obtained lithium-containing composite oxide was introduced into pure water of 25° C. so as to be 1500 g/l and stirred for 30 min, thereafter was subjected to solid-liquid separation to be dried and recovered for obtaining the cathode active material.

Example 3

A cathode active material for a nonaqueous electrolyte secondary battery was obtained and evaluated in a similar manner to Example 1 except that a mixed aqueous solution of metal salt was adjusted by dissolving nickel sulfate, cobalt sulfate and titanium sulfate such that a molar ratio of the metal elements of Ni:Co:Ti became 0.74:0.14:0.02 in crystallizing the composite hydroxide, an aqueous solution of sodium aluminate was added such that a ratio of Ni:Co:Al:Ti became 0.74:0.14:0.1:0.02 in neutralization, Al-compound coating was not carried out after the crystallization reaction, and a firing temperature was adjusted to 780° C.

Example 4

A cathode active material for a nonaqueous electrolyte secondary battery was obtained and evaluated in a similar manner to Example 1 except that the lithium-containing composite oxide obtained in Example 3 was introduced into pure water of 25° C. so as to be 1500 g/l and stirred for 30 min, thereafter was subjected to solid-liquid separation to be dried and recovered for obtaining the cathode active material.

Example 5

A cathode active material for a nonaqueous electrolyte secondary battery was obtained and evaluated in a similar manner to Example 1 except that an Al coating amount and an adding amount of titanium oxide were adjusted such that a ratio of Ni:Co:Al:Ti became 0.745:0.20:0.05:0.005, and the obtained lithium-containing composite oxide was introduced into pure water of 25° C. so as to be 1500 g/l and stirred for 30 min, thereafter was subjected to solid-liquid separation to be dried and recovered for obtaining the cathode active material.

Example 6

A cathode active material for a nonaqueous electrolyte secondary battery was obtained and evaluated in a similar manner to Example 1 except that dissolving amounts of nickel sulfate and cobalt sulfate, an Al coating amount, and an adding amount of titanium oxide were adjusted such that a ratio of Ni:Co:Al:Ti became 0.745:0.10:0.15:0.005, and the obtained lithium-containing composite oxide was introduced into pure water of 25° C. so as to be 1500 g/l and stirred for 30 min, thereafter was dried and recovered for obtaining the cathode active material.

Comparative Example 1

A cathode active material for a nonaqueous electrolyte secondary battery was obtained and evaluated in a similar manner to Example 1 except that titanium oxide was not added in a mixing step in producing the cathode active material.

Comparative Example 2

A cathode active material for a nonaqueous electrolyte secondary battery was obtained and evaluated in a similar manner to Example 1 except that titanium oxide was not added in a mixing step in producing the cathode active material, and the obtained lithium-containing composite oxide was introduced into pure water of 25° C. so as to be 1500 g/l and stirred for 30 min, thereafter was dried and recovered for obtaining the cathode active material.

Comparative Example 3

A cathode active material for a nonaqueous electrolyte secondary battery was obtained and evaluated in a similar manner to Example 1 except that titanium oxide powder was added in the mixing step in producing the cathode active material such that a molar ratio of metal elements of Ni:Co:Al:Ti became 0.715:0.135:0.95:0.05.

Comparative Example 4

A cathode active material for a nonaqueous electrolyte secondary battery was obtained and evaluated in a similar manner to Example 1 except that a firing temperature was adjusted to 850° C.

(Evaluation)

Since the cathode active materials of Examples 1 to 6 were produced according to the present invention, site occupancies of metal ions except lithium are 2% or less in a 3a site with a small particle diameter and a uniform particle size distribution. The coin type batteries 1 formed with these cathode active materials have a high initial discharge capacity, excellent cycle characteristics, and also a low positive electrode resistance. Accordingly, batteries having excellent characteristics are provided. Additionally, an increase of a reaction resistance due to the washing process cannot be recognized.

According to Comparative Example 1, the positive electrode resistance is high and the cycle characteristics are reduced compared with Examples 1 to 6 in which the average particle diameters are substantially similar thereto because titanium was not added.

According to Comparative Example 2 in which the cathode active material having titanium not added in Comparative Example 1 was subjected to the washing process, the positive electrode resistance is significantly high due to the washing process.

According to Comparative Example 3, the site occupancy of metal ions except lithium is over 2% in the 3a site, the initial discharge capacity is low, and the positive electrode resistance is high because the adding amount of titanium was not appropriate.

According to Comparative Example 4, the site occupancy of metal ions except lithium is over 2% in the 3a site, the initial discharge capacity is low, the cycle characteristics are reduced, and the positive electrode resistance is high because the firing temperature was not appropriate.

Example 7

Using a reaction chamber for continuous crystallization provided with a piping for overflowing at a top part, crystallization was carried out by a general method in which a mixed aqueous solution with its concentration 1.8 mol/L prepared by dissolving nickel sulfate and cobalt sulfate into water so as to make a ratio of Ni:Co equal to 0.75:0.14, and a 25% aqueous sodium hydroxide solution and a 25% aqueous ammonia as neutralizer solutions were added continuously at a constant flow rate while maintaining the pH of the liquid at a constant value of 12.0 in terms of a pH as measured at a liquid temperature of 25° C. as a standard, and then, a overflowing slurry was continuously recovered. A mean residence time in the chamber was regulated to be 10 hours, and a crystallized product of composite hydroxide was obtained by recovering the slurry after an equilibrium state was attained in the continuous chamber, followed by conducting solid-liquid separation.

The obtained crystallized product was transferred to another reaction chamber and mixed with water at an ordinary temperature to form a slurry. To this mixed aqueous solution were added an aqueous solution of sodium aluminate and sulfuric acid while stirring to adjust the pH of the slurry. Thereafter, a surface of nickel cobalt composite hydroxide particles was covered with aluminum hydroxide by continuing stirring for 1 hour. At that time, the aqueous solution of sodium aluminate was added such that a molar ratio of metal elements of Ni:Co:Al in the slurry became 0.75:0.14:0.10.

A composite hydroxide was obtained by filtering the aqueous solution and washing the particles subjected to aluminum hydroxide coating after the stirring was stopped.

The composite hydroxide particles were subjected to a heat treatment in an air flow (oxygen: 21% by volume) at a temperature of 700° C. for 6 hours, and the composite oxide particles were recovered.

Lithium hydroxide was weighed such that a ratio of Li/Me became 1.06, and further, titanium oxide powder was weighed such that a molar ratio of metal elements of Ni:Co:Al:Ti became 0.75:0.14:0.10:0.01. Then, the recovered composite oxide particles were mixed therewith to form a mixture. The mixing was carried out using a shaker-mixer apparatus (TURBULA® Type T2C, manufactured by Willy A. Bachofen (WAB) AG).

The obtained mixture was subjected to calcination in an oxygen flow (oxygen: 100% by volume) at 500° C. for 4 hours, thereafter fired at 780° C. for 10 hours, and cooled followed by disintegrating. The obtained lithium-containing composite oxide was regarded as a cathode active material. An average particle diameter of the obtained cathode active material was 8.3 μm. A powder X-ray diffraction analysis of the obtained cathode active material with a Cu—Kα ray revealed that the material had a single phase of a hexagonal layered crystal. Furthermore, a chemical analysis of the cathode active material indicated to be $Li_{1.06}Ni_{0.75}Co_{0.14}Al_{0.1}Ti_{0.01}O_2$. Additionally, Rietveld refinement was carried out with respect to an X ray diffraction pattern, so that a site occupancy of metal ions except lithium in the 3a site was calculated to be 1%.

Figure 2:
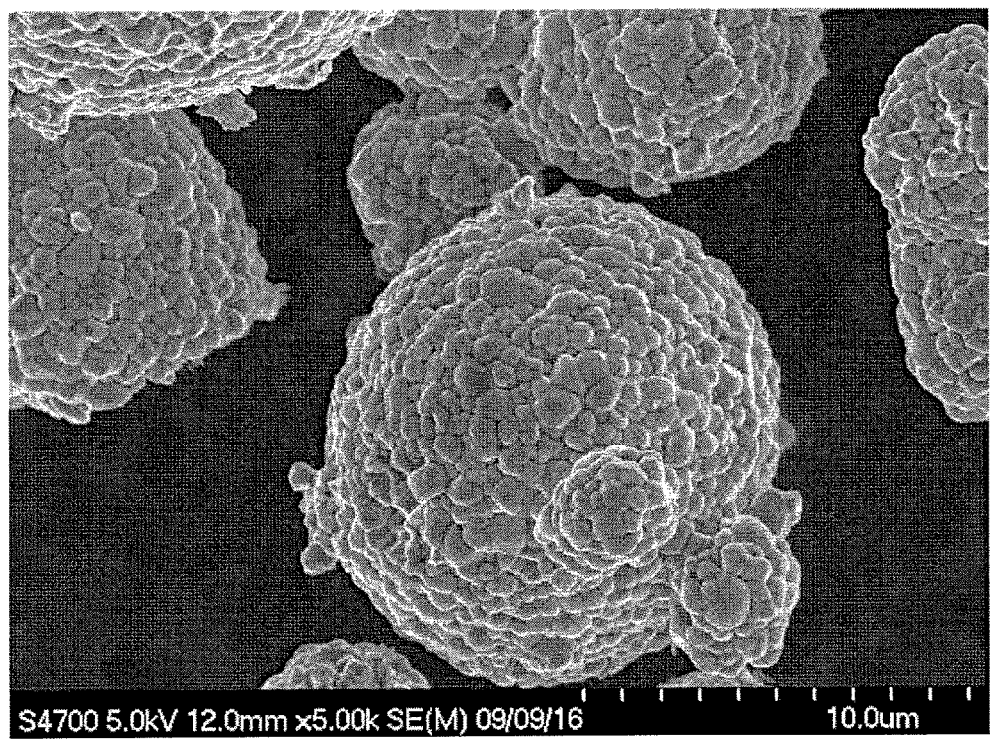
FIG. 2 shows an SEM photograph (magnification of observation: ×5,000) of a lithium nickel composite oxide in Example 7.

According to an SEM photograph (FIG. 2), or results of SEM observation of the cathode active material, it was ascertained that the obtained composite hydroxide particles were substantially spherical. Also, according to a photograph of a cross section of the particle (FIG. 3(A)) taken by a transmission electron microscope (scanning transmission electron microscope HD-2300A, manufactured by Hitachi High-Technologies Corporation, hereinafter referred to as TEM) and a photograph of Ti surface (FIG. 3(B)), it was ascertained that titanium was concentrated on a surface of the primary particles or a grain boundary between primary particles.

A coin type battery 1 having a positive electrode formed with the cathode active material was subjected to a charge and discharge test, which revealed that the coin type battery 1 had an initial discharge capacity of 180.5 mAh/g, a discharge capacity after 500 cycles of 162.4 mAh/g, and a capacity retention rate of 90%. Additionally, a positive electrode resistance was shown to be 4.0Ω. Table 2 shows the site occupancies of metal ions except lithium, the initial discharge capacities, the positive electrode resistances and the capacity retention rates after 500 cycles.

With regard to Examples 2 to 10 and Comparative Examples 5 to 8 below, only the substances and conditions changed from the aforementioned Example 7 are referred to. In addition, results of each evaluation of Examples 2 to 10 and Comparative Examples 1 to 5 are shown in FIG. 7.

Example 8

A cathode active material for a nonaqueous electrolyte secondary battery was obtained and evaluated in a similar manner to Example 7 except that the obtained lithium-containing composite oxide was introduced into pure water of 25° C. so as to be 1500 g/l and stirred for 30 min, thereafter was subjected to solid-liquid separation to be dried and recovered for obtaining the cathode active material.

Example 9

A cathode active material for a nonaqueous electrolyte secondary battery was obtained and evaluated in a similar manner to Example 7 except that an Al coating amount and an adding amount of titanium oxide were adjusted such that a molar ratio of metal elements of Ni:Co:Al:Ti became 0.78:0.165:0.05:0.005 and a firing temperature was adjusted to 760° C.

Example 10

A cathode active material for a nonaqueous electrolyte secondary battery was obtained and evaluated in a similar manner to Example 7 except that the lithium-containing composite oxide obtained in Example 4 was introduced into pure water of 25° C. so as to be 1500 g/l and stirred for 30 min, thereafter was subjected to solid-liquid separation to be dried and recovered for obtaining the cathode active material.

Comparative Example 5

A cathode active material for a nonaqueous electrolyte secondary battery was obtained and evaluated in a similar manner to Example 7 except that titanium oxide was not added in a mixing step in producing the cathode active material.

Comparative Example 6

A cathode active material for a nonaqueous electrolyte secondary battery was obtained and evaluated in a similar manner to Example 7 except that titanium oxide was not added in a mixing step in producing the cathode active material, and the obtained lithium-containing composite oxide was introduced into pure water of 25° C. so as to be 1500 g/l and stirred for 30 min, thereafter was subjected to solid-liquid separation to be dried and recovered for obtaining the cathode active material.

Comparative Example 7

A cathode active material for a nonaqueous electrolyte secondary battery was obtained and evaluated in a similar manner to Example 7 except that a firing temperature was adjusted to 850° C.

Comparative Example 8

A cathode active material for a nonaqueous electrolyte secondary battery was obtained and evaluated in a similar manner to Example 7 except that a firing temperature was adjusted to 690° C.
(Evaluation)

Since the cathode active materials of Examples 7 to 10 were produced according to the present invention, site occupancies of metal ions except lithium are 2% or less in a 3a site. The coin type batteries 1 formed with these cathode active materials have a high initial discharge capacity, excellent cycle characteristics, and also a low positive electrode resistance. Accordingly, batteries having excellent characteristics are provided.

According to Comparative Example 5, the positive electrode resistance is high because titanium was not added. Further, according to Comparative Example 6, the cathode active material obtained in Comparative Example 5 was subjected to the washing process, so that the positive electrode resistance is significantly high and the cycle characteristics deteriorate.

According to Comparative Examples 7 and 8, the site occupancies of metal ions except lithium are over 2% in the 3a site, the initial discharge capacities are low, the cycle characteristics deteriorate, and the positive electrode resistances are high because the firing temperatures were not appropriate.

From the foregoing results, it is ascertained that when a cathode active material is produced according to the production method of the present invention, a nonaqueous electrolyte secondary battery formed with this cathode active material has a high initial discharge capacity, excellent cycle characteristics, and a low positive electrode resistance, indicating production of a battery having excellent characteristics.

INDUSTRIAL APPLICABILITY

The nonaqueous electrolyte secondary battery of the present invention is suitable for electric power supplies of small size mobile electronic devices which consistently require a high capacity (e.g., notebook-sized personal computers, mobile phone terminals, etc.), and also suitable for batteries for electric automobiles which require a high power.

Additionally, the nonaqueous electrolyte secondary battery of the present invention is superior in safety, and size reduction and increase of the output are enabled; therefore, it is suitable for an electric power supply for electric automobiles having limited mounting space.

Moreover, the nonaqueous electrolyte secondary battery of the present invention can be adopted not only to an electric power supply for electric automobiles exclusively driven by electric energy, but also to an electric power supply for hybrid automobiles, generally referred to, in which a combustion engine such as a gasoline engine or diesel engine is used in combination.

REFERENCE SIGNS LIST

1 coin type battery
2 case
3 electrode
3*a* positive electrode
3*b* negative electrode
3*c* separator

The invention claimed is:

1. A cathode active material for a nonaqueous electrolyte secondary battery represented by a general formula:

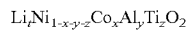

$Li_tNi_{1-x-y-z}Co_xAl_yTi_zO_2$ wherein 0.98≤t≤1.10, 0≤x≤0.30, 0.03≤y≤0.15, 0.001≤z≤0.03; and comprising a hexagonal lithium-containing composite oxide with a layer structure of secondary particles having primary particles,
wherein the cathode active material is made by firing the lithium-containing composite oxide at over 760° C. and not higher than 780° C. thereby forming an intermediate of a lithium titanium oxide and a lithium nickel dioxide in a grain boundary between the primary particles.

2. The cathode active material for a nonaqueous electrolyte secondary battery according to claim 1, wherein a site occupancy of metal ions except lithium obtained by Rietveld refinement using X-ray diffraction of the lithium-containing composite oxide is 2% or less in a 3a site if each site of 3a, 3b and 6c in the lithium-containing composite oxide is represented by $[Li]_{3a}[Ni_{1-x-y-z}Co_xAl_yTi_z]_{3b}[O_2]_{6c}$.

3. The cathode active material for a nonaqueous electrolyte secondary battery according to claim 1, wherein a shape of the secondary particle is spherical or substantially spherical.

4. The cathode active material for a nonaqueous electrolyte secondary battery according to claim 1, wherein an average particle diameter of the secondary particles is 3 to 8 μm, and a value represented by a expression of: [(d90−d10)/average particle diameter] as a marker indicating spreading of a particle size distribution is 0.60 or less.

5. A method for producing a cathode active material for a nonaqueous electrolyte secondary battery according to claim 1, the method comprising the steps of:
heat treating a nickel cobalt aluminum composite hydroxide represented by a general formula:

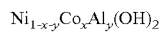

$Ni_{1-x-y}Co_xAl_y(OH)_2$ wherein 0≤x≤0.30, 0.03≤y≤0.15;
mixing the nickel cobalt aluminum composite hydroxide and/or a nickel cobalt aluminum composite oxide, a lithium compound, and a titanium compound; and
firing the mixture at over 760 to 780° C. for 4 hours or more.

6. The mixture for producing a cathode active material for a nonaqueous electrolyte secondary battery according to claim 5, wherein an average particle diameter of the composite hydroxide is 3 to 7 μm, and a value represented by a expression of: [(d90−d10)/average particle diameter] as a marker indicating spreading of a particle size distribution is 0.55 or less.

7. The method for producing a cathode active material for a nonaqueous electrolyte secondary battery according to claim 5, wherein a washing process is carried out after the firing.

8. A method for producing a cathode active material for a nonaqueous electrolyte secondary battery according to claim 1, the method comprising the steps of:

heat treating a nickel cobalt aluminum titanium composite hydroxide represented by a general formula:

$$Li_tNi_{1-x-y-z}Co_xAl_yTi_z(OH)_2$$

wherein $0 \leq x \leq 0.30$, $0.03 \leq y \leq 0.15$, $0.001 \leq z \leq 0.03$;

mixing the nickel cobalt aluminum titanium composite hydroxide and/or a nickel cobalt aluminum titanium composite oxide, and a lithium compound; and firing the mixture at over 760 to 780° C. for four hours or more.

9. A nonaqueous electrolyte secondary battery having a positive electrode formed with the cathode active material for a nonaqueous electrolyte secondary battery according to claim 1.

* * * * *